(12) United States Patent
Lovin et al.

(10) Patent No.: US 7,080,770 B2
(45) Date of Patent: Jul. 25, 2006

(54) METHOD AND SYSTEM OF INERTIA FRICTION WELDING

(75) Inventors: Jeff Lovin, Mishawaka, IN (US); Robert Adams, Granger, IN (US); Dan Kuruzar, Dowagiac, MI (US); Dietmar Spindler, Niles, MI (US)

(73) Assignee: Manufacturing Technology, Inc., South Bend, IN (US)

( * ) Notice: Subject to any disclaimer, the term of this patent is extended or adjusted under 35 U.S.C. 154(b) by 0 days.

(21) Appl. No.: 11/218,373

(22) Filed: Sep. 2, 2005

(65) Prior Publication Data
US 2006/0049235 A1    Mar. 9, 2006

Related U.S. Application Data

(60) Provisional application No. 60/607,153, filed on Sep. 3, 2004.

(51) Int. Cl.
*B23K 20/00* (2006.01)
*B23K 20/12* (2006.01)

(52) U.S. Cl. .................................. 228/102; 228/114.5

(58) Field of Classification Search ............... 228/102, 228/114.5, 9, 8, 113, 2.1, 2.3; 156/64, 73.5, 156/580, 366
See application file for complete search history.

(56) References Cited

U.S. PATENT DOCUMENTS 3,542,274 A * 11/1970 Miller .......................... 228/2.3
3,714,509 A * 1/1973 Coleman et al. ............. 361/242
3,819,339 A * 6/1974 Takagi et al. ................ 228/102
3,888,405 A * 6/1975 Jones et al. ................... 228/2.3
3,998,373 A   12/1976 Jones et al.
4,757,932 A    7/1988 Benn et al.

FOREIGN PATENT DOCUMENTS

GB           2137774 A  * 10/1984

* cited by examiner

*Primary Examiner*—Kevin Kerns
*Assistant Examiner*—Michael Aboagye
(74) *Attorney, Agent, or Firm*—Barnes & Thornburg LLP; Thomas J. Donovan

(57) ABSTRACT

A method and system of inertia friction welding that enables the production of inertia friction welds in which the final upset can be controlled to an operator specified target. The method utilizes any profile-based upset control technique, including but not limited to torque modulation and pressure (load) modulation. The method dynamically modifies the profile upset setpoints to systematically drive the upset formation to produce a weld with the targeted upset. The method and system also enables the production of inertia friction welds in which the final welded part length can be controlled to an operator specified target. The system and associated method comprises inertia friction welding a pair of sample parts to form a sample weld while acquiring data relating to the formation of the sample weld. The system and associated method also comprises inertia friction welding a pair of production parts to form a production weld using the profile data acquired during the friction welding of the pair of sample parts to achieve the predetermined upset formation.

35 Claims, 9 Drawing Sheets

METHOD AND SYSTEM OF INERTIA FRICTION WELDING

PRIORITY CLAIM

This application claims priority to the U.S. Provisional Application filed on Sep. 3, 2004 having Ser. No. 60/607,153 to the extent permitted by law.

BACKGROUND

The present disclosure relates to a method and system of inertia friction welding together parts.

Friction welding can be used to join similar and dissimilar metals in a short period of time compared to more conventional welding methods. Inertia friction welding is a variation of friction welding in which the energy required to make the weld is supplied primarily by stored rotational kinetic energy of the welding machine.

During inertia friction welding, material from the parts is displaced or "upset" which results in a reduction of the combined length of the welded parts. Thus, the finished product length is the sum of the length of the parts before the inertia friction welding process minus the effect of the upset experienced by the parts during the inertia friction welding process. Upset, and thus final product length, are subject to unpredictable variations and need to be controlled in inertia welding.

Profile based techniques for upset control have previously been used. Pending patent application of Lovin et al, Ser. No. 10/924,633, filed Aug. 24, 2004, controls upset by dynamically modifying the applied spindle motor torque during the deceleration to maintain an upset versus spindle velocity profile duplicating the upset of a previous test weld. This technique has been termed "torque modulated upset control" for those versed in the art. U.S. Pat. No. 4,757,932 Benn, et al controls upset by dynamically modifying the applied axial pressure during the deceleration to maintain an upset versus spindle velocity profile duplicating the upset of a previous test weld. This technique has been termed "pressure (or load) modulated upset control" for those versed in the art. However, Benn, et al and Lovin, et al, make no provisions for targeting either upset or final part length in inertia friction welding. These upset control techniques only reduce overall upset variability by precisely duplicating the upset dictated by a previous profile weld.

Techniques for final welded part length control and/or upset targeting in inertia welds have been used. U.S. Pat. No. 3,998,373 Jones, et al modified weld speed based on a preweld measurement of part dimensions attempting final welded part length control. If more upset is needed because the combined preweld length of the work parts is greater than nominal, the starting weld speed is increased. Conversely, if less upset is needed because the combined preweld length of the work parts is less than nominal, the starting weld speed is decreased. However, once the inertia weld cycle is initiated, upset is still an uncontrolled result of the weld process, and therefore the accuracy of the final part length is still limited to the variation in upset expected.

SUMMARY OF INVENTION

The present disclosure comprises one or more of the following features or combinations thereof disclosed herein or in the Detailed Description below.

The present disclosure relates to a method of inertia friction welding comprising inertia friction welding together the pair of sample parts resulting in rotational deceleration of the spindle, movement of the slide toward the spindle and contact between the one sample part and the other sample part causing upset formation in order to form a sample weld. During the inertia friction welding of the sample parts, data is acquired related to the rotational deceleration of the spindle and the movement of the slide during the formation of the sample weld, wherein a profile is calculated from the acquired data.

Next, a specified amount of upset formation to be experienced by a pair of production parts is predetermined. The pair of production parts are then inertia friction welded together resulting in rotational deceleration of the spindle, movement of the slide toward the spindle and contact between the one production part and the other production part causing upset formation and resulting in formation of a production weld.

During the inertia friction welding of the pair of production parts, an upset error signal is generated by calculating the difference between the upset formation resulting from the inertia friction welding of the pair of production parts and the upset setpoint determined from the profile which is modified based on the specified upset target. Based on the upset error signal, an input applied to the weld system during the inertia friction welding of the pair of production parts is modulated thereby controlling the upset formation of the pair of production parts to achieve the specified amount of upset formation.

One of the important objects of the present invention is to provide an inertia friction welding process that permits the production of welded parts having any targeted upset. The present invention is not limited to the duplication of upset achieved in a prior sample weld.

Another important object of the present invention is to provide an inertia friction welding process that is capable of utilizing any profile-based upset control technique, including, but not limited to, torque modulation and pressure modulation, to produce welded parts having any targeted upset.

A further object of the present invention is to provide an inertia friction welding process that is capable of producing a welded part of predetermined final length by achieving a targeted upset formation during the friction welding process.

A summary of the process control embodied in the present invention is illustrated in FIG. 1A. The control system, illustrated in FIG. 2, is described in more detail later in this document. The control elements are embedded in logic controller 42, which is electrically connected to CPU 34. Logic controller 42 controls the weld system 10 (FIG. 1) in accordance with the weld parameters transmitted by CPU 34.

Referring to FIG. 1A, an upset setpoint 116 representing a profile 114 setpoint is determined from a lookup table providing an upset setpoint for any given value of spindle speed during a production inertia cycle. Upset setpoint 116 is transmitted to a profile modifier 117 that produces a new dynamic setpoint 144 as a function of profile upset setpoint 116 and a value representing the specified upset target 119.

The upset error signal 142 is calculated as the difference between the dynamic upset setpoint 144 and the actual upset provided by the upset feedback signal 137. The error signal 142 is driven into a PID (proportional-integral-derivative) control algorithm 125, producing a command signal 154, as will be explained.

The command signal 154 is applied to final control element 131. The final control element, in response to the command signal 154 from the controller, manipulates 146 the process 10, producing measurable outputs 141 including spindle speed and slide position (related to upset). The weld process 10 is also subject to random disturbances 143.

Measuring devices including a slide encoder 133 and a spindle encoder 135 are electronically connected to the output of welding system 10 to produce signals indicative of the position of slide 30 (FIG. 1) and the speed of spindle 18, respectively. The slide encoder 133 transmits a signal 137 indicative of the actual upset feedback to the controller 42. In similar fashion, spindle encoder 135 transmits a signal 139 indicative of the actual spindle speed feedback to the setpoint lookup tables 114 that generate setpoint 116, thereby establishing an unmodified upset setpoint as a function of spindle speed.

In the specific example of a torque modulated and upset targeted weld system 10, the final control element 131 is the spindle drive 24 (FIG. 1), and command signal 154 is the torque command applied to the spindle drive 24. The manipulated variable 146 is in the form of modulated torque wherein modulating the torque applied to the spindle has a direct affect on the upset formation during the production weld cycle producing an inertia welded product having the desired, predetermined upset formation.

In the specific example of a pressure modulated and upset targeted weld system 10, the final control element 131 is the pressure control valve operatively connected to the slide 30 (FIG. 1), and command signal 154 is the pressure command signal applied to the pressure control valve. The manipulated variable 146 is in the form of modulated pressure (or load) wherein modulating the pressure applied between the production parts has a direct affect on the rate of upset formation during the production weld cycle producing an inertia welded product having the desired, predetermined upset formation.

The presently described process control system provides a unique extension of known upset control techniques. Use of the inventive process control system forming the present invention enables the welding process to produce a friction weld with any targeted upset, not merely duplicating the upset of a prior sample weld. Thus, the present invention allows precise control and targeting of either the final upset or the final welded part length of the finished product.

The specific weld control techniques described herein are:
a. torque modulated and upset targeted inertia weld process; and
b. pressure modulated and upset targeted inertia weld process. Each of these techniques employs weld profile modification in which a new, or modified, upset setpoint is dynamically established for each value of spindle speed as the spindle decelerates during the weld process.

The techniques detailed in this disclosure enable the formation of a final welded product in which the operator is able to specify the final upset. Alternatively, the technique of upset targeting can be used to control final product length in an inertia weld. To apply either the torque modulated upset targeting or the pressure (load) modulated upset targeting technique to dictate the final product length in an inertia weld process, the target upset is predetermined based on the target final welded part length as follows: Target Upset=Work Part 1 Preweld Length+Work Part 2 Preweld Length−Target Final Welded Part Length.

The combined length of work parts 1 and 2 can be premeasured in another machine and the measurements may be transferred to the friction welder control through any of many standard communication links known in the art. Alternatively, the information may be entered by the user manually into the CPU interface. The combined length of work parts 1 and 2 can also be measured dynamically during the welding cycle.

Additional features of the present disclosure will become apparent to those skilled in the art upon consideration of the following detailed description of illustrative embodiments of the disclosure.

BRIEF DESCRIPTION OF THE DRAWINGS

The detailed description particularly refers to the accompanying figures in which.

DETAILED DESCRIPTION

Figure 1:
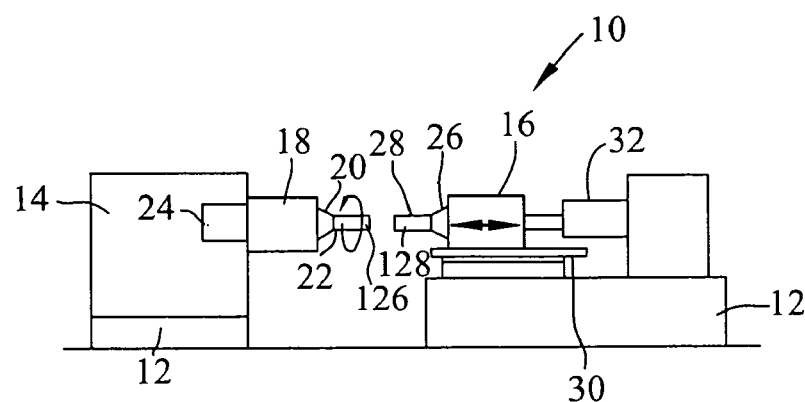
FIG. 1 is an elevational view, schematic in nature, of a weld system in accordance with an embodiment of the present disclosure.
Figure 1A:
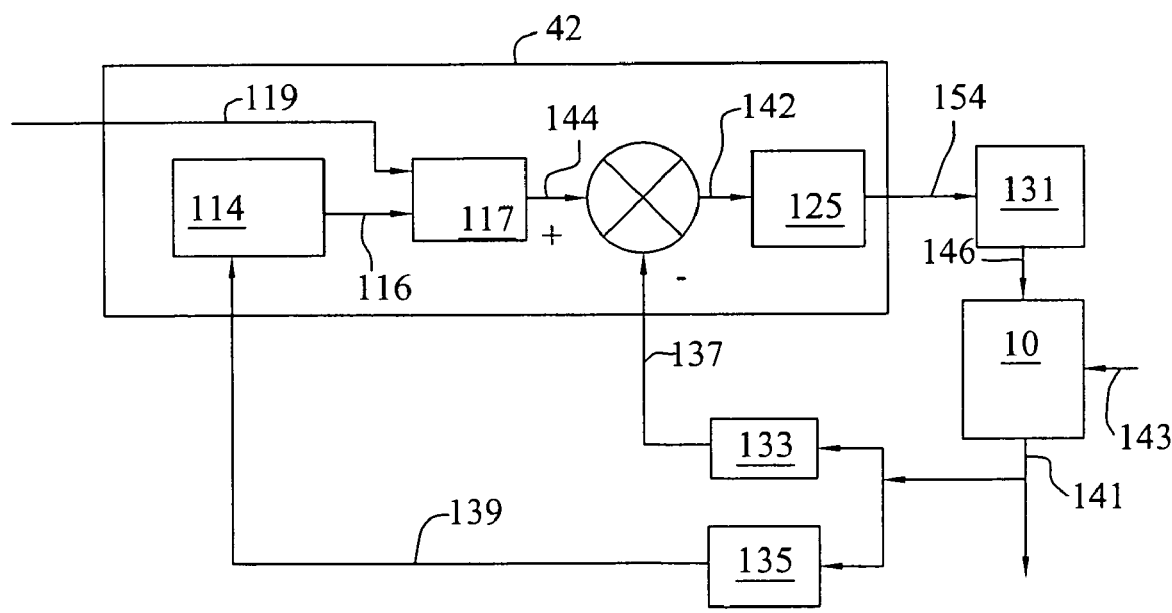
FIG. 1A is a process control schematic diagram of the present invention.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the number and arrangements of components set forth in the following description or illustrated in the drawings.

Figure 2:
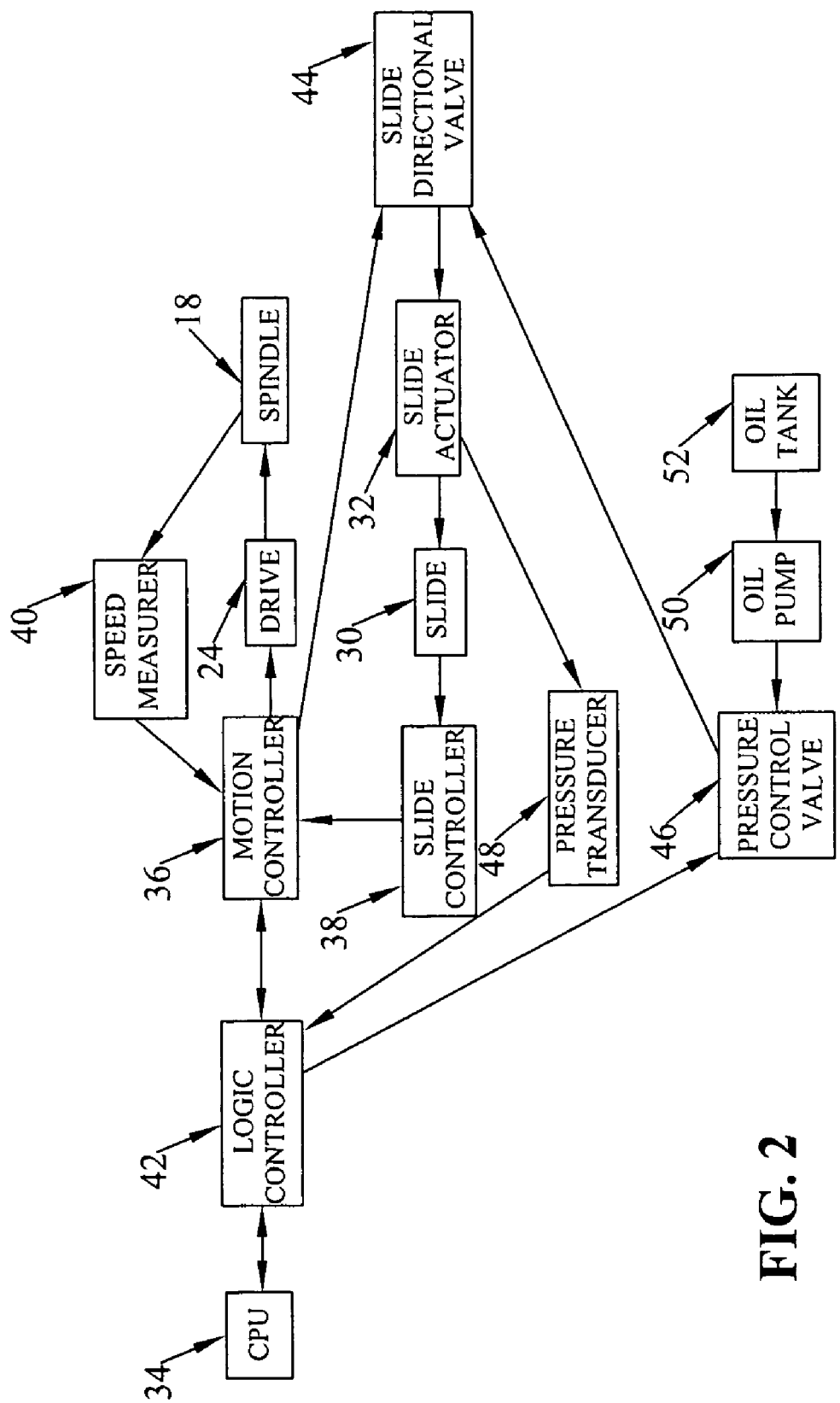
FIG. 2 is a diagram illustrating components of the weld system of FIG. 1.

FIG. 1 illustrates a weld system 10 in the form of a friction welder 12. The friction welder 12 includes a headstock portion 14 and a tailstock portion 16 wherein the headstock portion 14 includes a spindle 18 having a rotating chuck 20 for engaging a first work part or component 22. A drive 24 such as a motor is configured to apply a torque to the spindle 18 to rotate the spindle via commands from a motion controller 36 (FIG. 2). The spindle 18 may be equipped with additional mass, such as a flywheel, to increase the moment of inertia of the rotating spindle.

The tailstock portion 16 includes a non-rotating chuck 26 for engaging a second work part or component 28. The tailstock portion 16 mounts to a slide 30 wherein a slide actuator 32 slides the non-rotating chuck 26 toward the rotating chuck 20. Since the rotating chuck 20 and the non-rotating chuck 26 engage the first component 22 and the second component 28, respectively, the first component 22 and the second component 28 contact each other during the weld cycle as will be discussed.

Turning to FIG. 2, the weld system 10 is shown in schematic form further comprising the drive 24, a central processing unit (CPU) 34, the motion controller 36, a slide encoder 38, a speed measurer 40, a logic controller 42, the slide 30, the slide actuator 32, a slide directional valve 44, a pressure control valve 46, a pressure transducer 48, a pump 50, and a tank 52.

The CPU 34 provides an interface to the operator to allow weld parameter entry and storage of weld parameters and communicates the weld parameters to the logic controller 42. The CPU 34 also reads weld data from the logic controller 42, provides an interface to display the weld data to the operator, and stores the weld data. The drive 24 applies torque to rotationally accelerate, decelerate, or maintain the rotational speed of the spindle 18. The slide encoder 38 measures and signals the linear position of the slide 30 (related to upset) to the motion controller 36 wherein the motion controller 36 represents the intelligence that accepts commands related to slide position from the logic controller 42 and translates those commands into commands issued to the slide actuator 32 which moves the slide 30.

The slide actuator 32 may comprise a hydraulic cylinder, although any other suitable device capable of providing a force could be used. As such, the slide actuator 32 connects to a fluid pressure system consisting of the oil tank 52, the oil pump 50, the slide directional valve 44, the pressure control valve 46, and the pressure transducer 48. The logic controller 42 controls the slide actuator 32 via the slide directional valve 44. The pressure transducer 48 is connected to the logic controller 42 which provides a pressure feedback signal so that the logic controller 42 can command the pressure control valve 46 to control the pressure in the hydraulic cylinder slide actuator 32, and thus, provide the necessary axial force. The motion controller 36 has the ability to monitor the pressure feedback signal supplied by the pressure transducer 48 to adjust the pressure command issued to the pressure control valve 46 in real time.

The speed measurer 40 measures and signals the rotation speed of the spindle 18 to the motion controller 36, wherein the motion controller 36 represents the intelligence that accepts commands related to spindle speed from the logic controller 42 and translates those commands into commands issued to the drive 24. The motion controller 36 has the ability to monitor the spindle speed information supplied by the speed measurer 40 to adjust the torque output of the drive 24 in real time. The logic controller 42 controls the functions and sequences of the weld system 10 and the friction welder 12 according to the weld parameters supplied by the CPU 34. The source code for the CPU 34 and the logic controller 42 may be written in any suitable manner.

The CPU 34 operatively connects to the logic controller 42 which is operatively connected to the motion controller 36. The motion controller 36 operatively connects to the drive 24 to command the drive 24 to rotate the spindle 18. The motion controller 36 also operatively connects to the slide directional valve 44 which is operatively connected to the slide actuator 32 to move the slide 30. The slide encoder 38 measures the linear position of the slide 30 as it moves during the formation of the weld at set time intervals while the speed measurer 40 measures the speed of the spindle 18. Accordingly, the slide encoder 38 and speed measurer 40 are operatively connected to the motion controller 36 such that the motion controller 36 analyzes the spindle angular velocity and slide position during different inertia weld phases such as an acceleration phase, a disengaged phase, a thrust phase, a deceleration phase, and a cooling dwell phase.

As known in the art, the spindle drive torque command and spindle drive torque may be essentially identical in a correctly functioning machine since drive torque would be slightly delayed beyond the resolution of the time base. Additionally, the pressure feedback and pressure command are both related to force applied to bring the two meeting faces of the components under load, since pressure is proportional to force in a hydraulic cylinder. Further, the upset caused during formation of a weld is the loss of combined length of the component parts as the component parts are friction welded together. Upset zero position is the position of the slide under maximum weld load where the two meeting faces of the components are in contact with each other with zero upset formation. Upset final position is defined as that position of the slide under maximum weld load where the components are welded together with final upset formation. As such, the final upset equals the displacement of the slide between upset zero position and upset final position. Length as used herein, is intended to mean, for example, the length of the parts as measured along the direction of the slide movement and thus the direction of force applied to the slide. Additionally, although the term in physics for spindle rotation is spindle angular velocity; the term, spindle speed, is typically used as standard terminology for friction weld parameters. Co-pending U.S. patent application Ser. No. 10/924,633 filed Aug. 24, 2004 relates to profile creation in the case of torque modulation for a friction weld cycle, the application being incorporated herein. A profile is an upset versus speed model of a sample weld that is based on actual weld data acquired during the deceleration phase of a sample weld cycle.

Figure 3:
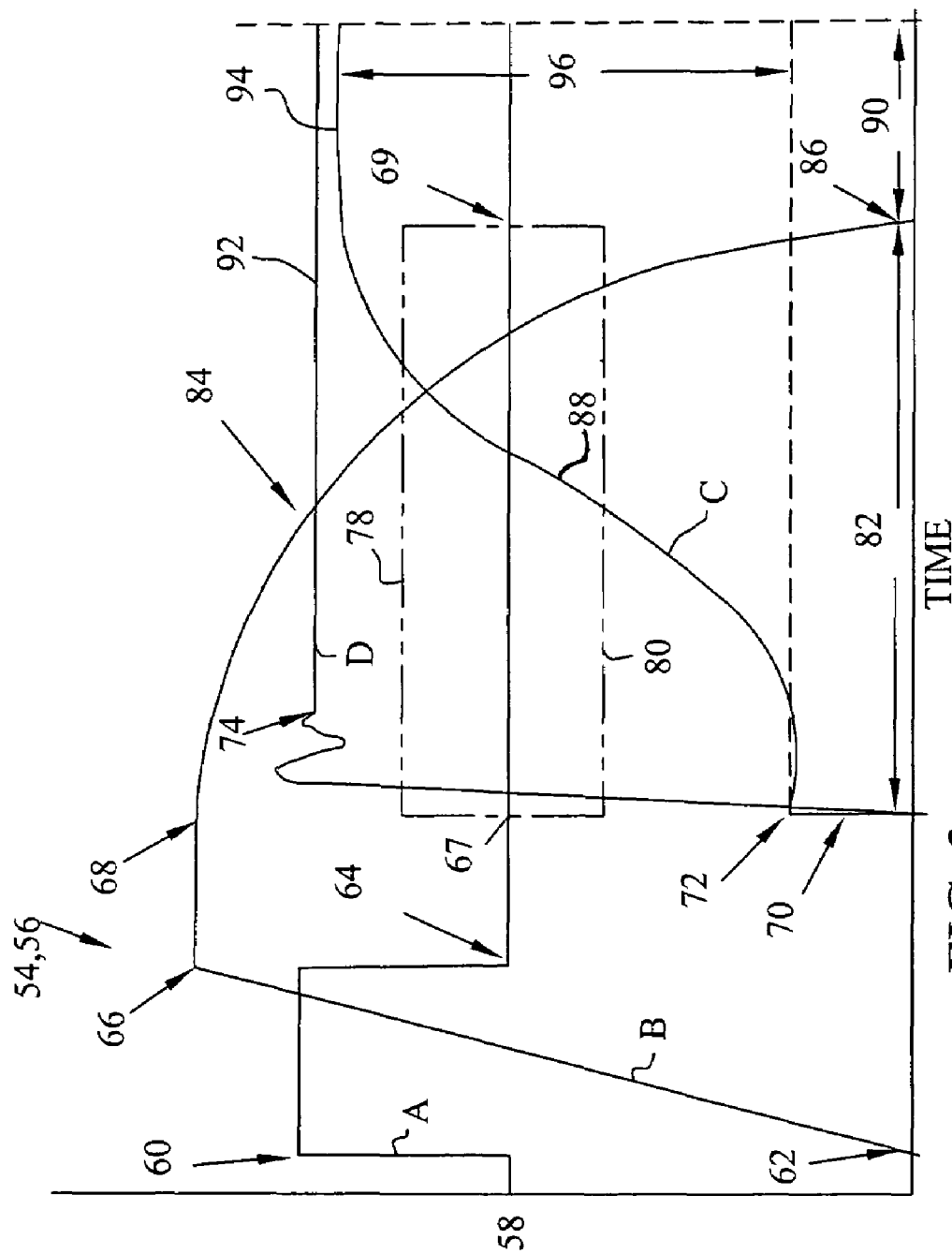
FIG. 3 is a graph based on data relating to the formation of an inertia sample weld formed by inertia friction welding, illustrating drive torque command, spindle angular velocity, upset, and pressure all on the vertical axis versus time represented on the horizontal axis, and also illustrating the various phases of an inertia sample weld in accordance with an embodiment of the present disclosure.

Referring to FIG. 3, the formation of an inertia sample weld 54 is shown graphically, wherein the horizontal axis represents time and the vertical axis represents various measured values and system commands during formation of the inertia sample weld 54. To form the inertia sample weld 54, the operator first inputs weld parameters that define an inertia sample cycle 56. The operator then loads the pair of sample parts 22, 28 (FIG. 1) by engaging the first sample work part 22 with the rotating chuck 20 (FIG. 1) connected to the spindle 18 (FIG. 1) while engaging the second sample part 28 with the non-rotating chuck 26 (FIG. 1) connected to the slide 30 (FIG. 1). The operator issues a start command 58 to start the inertia sample cycle 56.

The motion controller 36 (FIG. 2) issues a torque command 60 to the drive 24 (FIG. 2) to begin rotationally accelerating the spindle, wherein trace "A" in FIG. 3 represents the torque applied by the drive 24 to the spindle 18. The spindle 18, initially at rest, begins an initial rotation 62 during an acceleration phase, wherein trace "B" in FIG. 3 represents the speed of the spindle 18 during formation of the inertia sample weld 54. The torque command 60 applied to the spindle 18 drops to a zero torque level 64 when a predetermined disengage speed 66 is attained. During this disengage phase, the spindle 18 rotates free from any influence from the drive 24. As such, the spindle 18 rotationally decelerates at a rate dependent on the inertia and frictional losses inherent in the weld system 10.

Once the spindle 18 decelerates naturally to a preset weld speed 68, the motion controller 36 commands the slide actuator 32 (FIG. 2) to move the slide 30 (FIG. 2) to contact the opposed meeting faces of the two sample parts 22, 28. This contact is illustrated in the initial upset trace 70 as the slide 30 moves the meeting faces of the two sample parts 22, 28 together, wherein trace "C" in FIG. 3 represents the upset formed during the inertia sample cycle 56. At initial contact of the meeting faces of the sample parts 22, 28 the motion controller 36 and the slide encoder 38 (FIG. 2) establish an upset zero position 72.

During the contact of the sample parts 22, 28, pressure builds to weld pressure 74 wherein trace "D" in FIG. 3 represents the pressure between the sample parts 22, 28. Also at this time, the drive 24, may apply zero torque 67 to the spindle 18 during a thrust phase. Alternatively, the drive 24 may apply a constant positive 78 or constant negative torque 80 at this time and thus increase or decrease the energy to be dissipated into the inertia sample weld 54, respectively.

The contact of the meeting faces of the sample parts 22, 28 puts a torque load on the spindle 18 due to the frictional weld torque between the two sample parts 22, 28. During a deceleration phase 82, this contact causes a rotational deceleration 84 of the spindle 18 to eventually reach a zero velocity 86. Optionally, at a predetermined "upset speed", the weld system 10, can increase the load on the two sample parts 22, 28 to an "upset pressure" (not shown).

In the formation of the inertia sample weld 54, the upset 88 formed during the part contact deceleration 82 of the spindle 18 is not controlled and is influenced by the natural characteristics of the weld, e.g. metallurgy of materials, geometry, etc. Once the spindle 18 achieves zero velocity 86, the drive 24 commands zero torque 69 to the spindle 18. At zero velocity 86, a cooling dwell period 90 is initiated where weld pressure 92 (or upset pressure) is maintained for a predetermined period of time. During the cooling dwell period 90, the upset 88 may continue to increase. A final upset position 94 may be determined at the end of the cooling dwell period 90, after the slide 30 movement toward the spindle 18 ceases. A total upset 96 of the inertia sample weld 54 can be calculated based on the difference between the upset zero position 72 and the upset final position 94. As such, the total upset 96 represents the displacement of the slide 30 caused by the formation of the upset during the inertia sample cycle 56.

Figure 4:
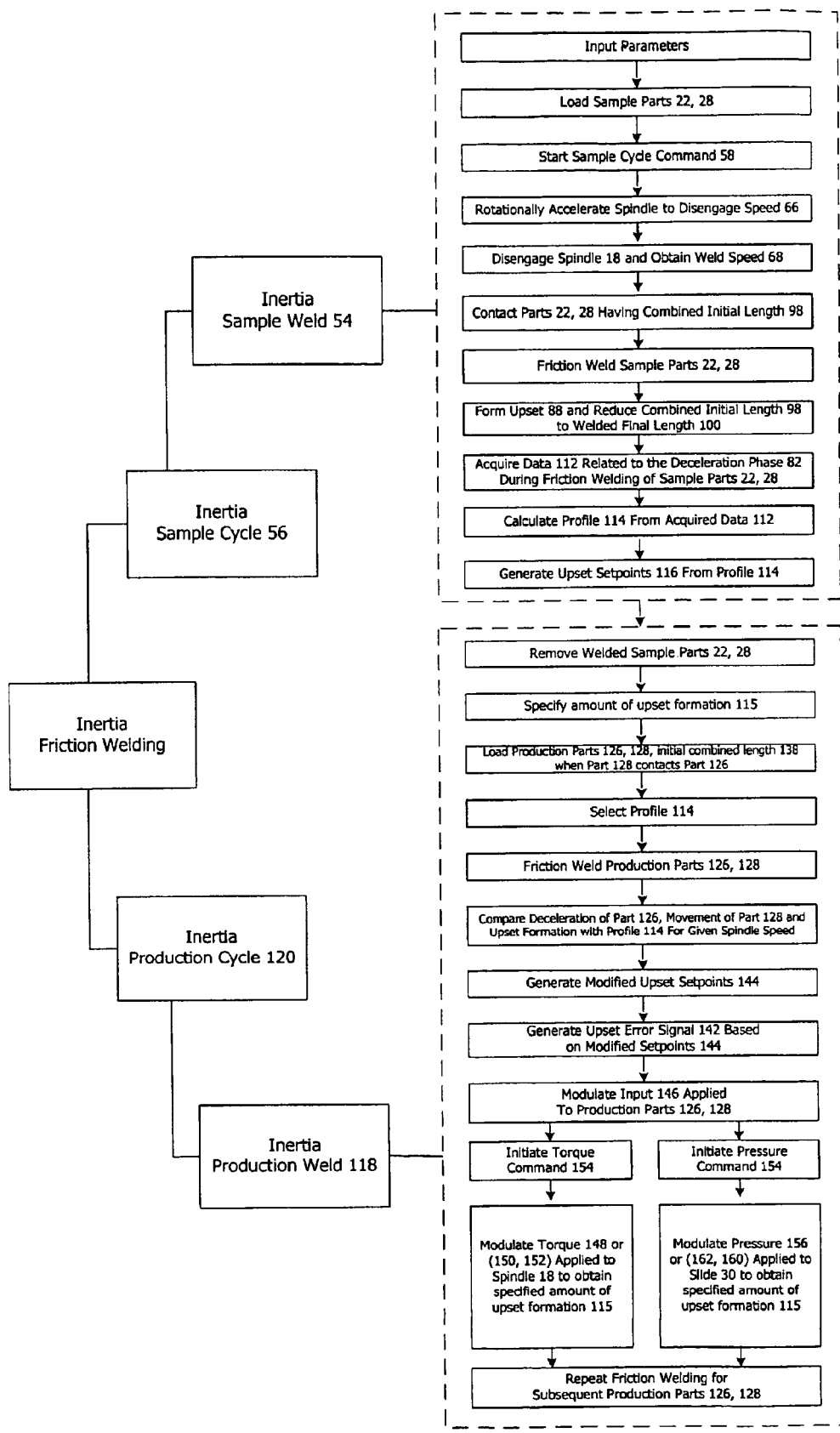
FIG. 4 is a flowchart illustrating steps of a method for welding together parts during formation of the inertia sample weld of FIG. 3, and illustrating steps of a method for welding together production parts based on the data acquired during the formation of the inertia sample weld of FIG. 3 utilizing the constant weld speed algorithm in accordance with an embodiment of the present disclosure.

Turning to FIG. 4 and referring to FIG. 3, a flowchart illustrates steps of the inertia sample cycle 56 for the formation of the inertia sample weld 54. As illustrated, the operator first inputs weld parameters that define the inertia sample cycle 56. The operator then loads the pair of sample parts 22, 28 by engaging the first sample part with the rotating chuck 20 connected to the spindle 18 while engaging the second sample part 28 with the non-rotating chuck 26. The operator then issues the start command 58 to initiate the inertia sample cycle 56.

The spindle 18 is then rotationally accelerated to the disengage speed 66 after which the drive 24 applies zero torque 64 to the spindle 18. The spindle 18 then decelerates naturally to the preset weld speed 68 wherein the motion controller 36 commands the slide actuator 32 to move the slide 30 to contact the oppose meeting faces of the two sample parts 22, 28 wherein the sample parts 22, 28 have a combined length 98 when sample part 28 contacts sample part 22. At initial contact of the meeting faces of sample part 22, 28 the motion controller 36 and the slide encoder 38 establish the upset zero position 72.

The contact of the meeting faces of the sample parts 22, 28 puts a torque load on the spindle 18 due to the frictional weld torque between the two sample parts 22, 28 during the deceleration phase 82 of the inertia sample cycle 56. The inertia friction welding of the sample parts 22, 28 results in rotational deceleration of sample part 22, movement of sample part 28 toward sample part 22 and formation of upset 88 which reduces the combined length 98. The contact causes the deceleration 84 of the spindle 18 to eventually reach zero velocity 86. At the end of the cooling dwell period 90, the total upset 96 of the inertia sample cycle 56 can be calculated based on the difference between the upset zero position 72 and the final upset position 94. Accordingly, the formation of the inertia sample weld 54 results in the formation of upset 88 which reduces the combined length 98 of the sample parts 22, 28 to a welded final length 100.

While executing the inertia sample cycle 56, the weld system 10 acquires weld data 112 relating to the rotational deceleration of the spindle 18 and the movement of the slide 30 during the deceleration phase 82. The data 112 can be used to characterize the rotational deceleration of the spindle 18 and sample part 22 and the axial movement of the slide 30 and sample part 28, and, the upset 88 formed during the part contact deceleration phase 82 of the inertia sample cycle 56 for the specific parts to be welded in subsequent production welds. As such, acquiring the data 112 comprises measuring the rotational speed of the spindle 18 at various instances of time during formation of the sample weld 54. Additionally, acquiring the data 112 comprises measuring the position of the slide 30 at various instances of time during formation of the sample weld 54 wherein the slide position and movement relate to the upset formation 88 experienced by the sample parts 22, 28. The upset 88 that forms during the part contact deceleration phase 82 of this sample inertia weld 54 is uncontrolled and therefore subject to some inherent and unpredictable variations. However, the weld data 112 acquired during the inertia sample cycle 56 can be analyzed to determine the precise upset 88 and the speed of the spindle 18 at various instants in time from the contact of the meeting faces of the sample parts 22, 28 to zero velocity 86 of the spindle 18, i.e., the part contact deceleration phase 82.

During the formation of the inertia sample weld 54, the weld system 10 measures and stores the weld data 112 at specific time intervals. The weld data 112 serve as a basis for calculating the upset 88 versus spindle velocity profile 114. The weld data 112 are typically measured during the entire weld cycle, but the measurements are critical during the part contact deceleration phase 82 of the inertia sample cycle 56. Additionally, thrust pressure may also be measured and stored with the weld data 112. During the formation of the sample inertia weld 54, the weld data 112 are acquired and temporarily stored by the logic controller 42.

When the inertia sample cycle 56 is complete, the CPU 34 reads the weld data 112 from the logic controller 42, displays the results to the operator, and stores a complete record of the weld data 112. The weld data 112 measured and stored can be in any suitable form that can then be used to form subsequent production welds requiring the same characteristic upset versus spindle velocity relationship as was measured during the part contact deceleration phase 82 of the inertia friction sample weld 54.

In the illustrated flowchart, the weld data 112 are used to calculate a profile 114. The weld data 112 include the speed of the spindle 18 as a function of time which may be represented as two discrete arrays, one array of spindle speeds and an associated array of time values at which the spindle speed was measured. As such, the weld data 112 may represent the rotational deceleration of the spindle 18 as a function of time. The weld data 112 used in the calculation of the profile 114 further include position of the slide 30 as a function of time represented as two discrete arrays, one array of slide positions and an associated array of time values at which the slide position was measured. As such, the weld data 112 may represent the movement of the slide 30 as a function of time. The weld data 112 also include the upset zero position 72 so that the formation of upset 88 can be calculated from the slide position data.

The weld data 112 are compiled into the profile 114, wherein the profile 114 is a calculated model of the relationship of the formation of upset 88 of the sample weld 54 as a function of the rotational speed of the spindle 18 during formation of sample weld 54. The profile 114 then serves as a basis for controlling upset formation during the part contact deceleration phase 82 of subsequent production inertia welds in order to target a specified amount of upset formation 115 at any given spindle velocity, and, thus, achieve the specified amount of upset formation 115.

In the present disclosure, the profile 114 is represented by a lookup table that provides upset setpoints 116 which represent distinct measurements of upset formation 88 as a function of spindle speed during the part contact deceleration phase 82 of the sample inertia cycle 56. As such, modeling the relationship of the formation of upset 88 with the rotational deceleration speed of the spindle 18 at various instances of time during formation of the sample weld 18 comprises generating the upset setpoint 116 for any given value of spindle speed. In other words, the profile 114 is an array in which the indices of the array are a factor of speed and the values stored in the array represent the upset that was measured at the corresponding spindle speed. Thus, at any given spindle speed, the corresponding upset setpoint 116 can be looked up for that spindle speed. As such, the profile 114 is indexed by the speed of the spindle 18. The index is calculated by multiplying the floating point representation of current speed and a floating point representation of a spindle-speed-to-index scaling factor, and rounding the result to produce an integer index. Since the weld data 112 are acquired through digital acquisition rates, the weld data 112 must be interpolated to fill in spindle velocity points where no actual data sample was measured to achieve a complete array of the profile 114.

The profiles as described in the present invention for use in upset targeting production welds are identical and interchangeable with the profiles described in Co-pending U.S. patent application Ser. No. 10/924,633 filed Aug. 24, 2004 for use in upset control production welds utilizing torque modulation. Data from the sample weld in both cases are acquired and compiled in the same manner and in the same format. Thus, once compiled, a profile may be selected for use in both simple upset control applications in which the target upset is restricted to the final upset of the sample weld and upset targeting applications in which the target upset may be different than the final upset of the sample weld.

After the CPU 34 compiles the profile 114 from the data of the inertia sample weld 54, the welded component is removed in order to execute any number of subsequent production welds.

Figure 5:
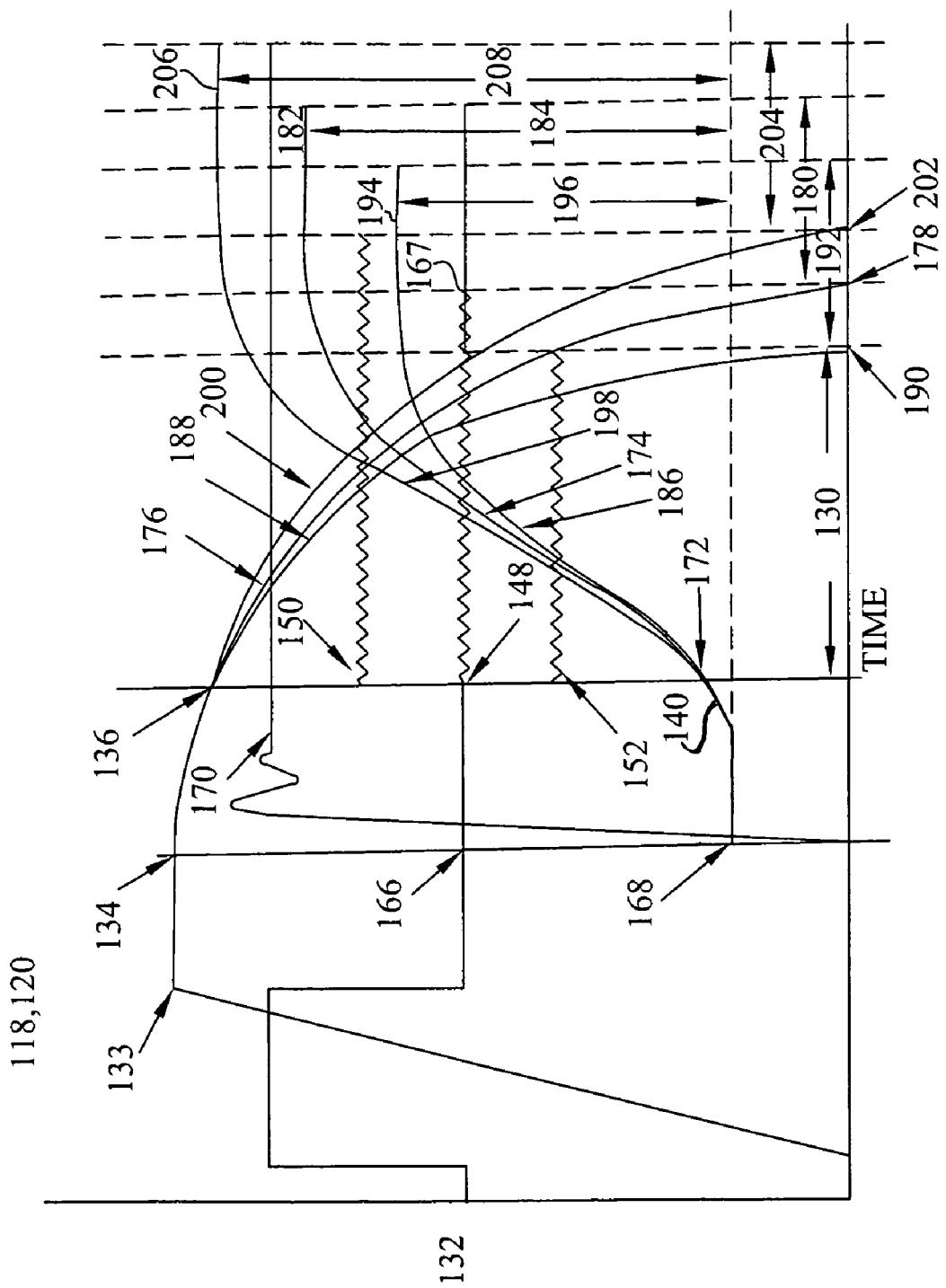
FIG. 5 is a graph based on data relating to the formation of three torque modulated and upset targeted production inertia welds formed by inertia friction welding utilizing a constant weld speed algorithm in accordance with an embodiment of the present disclosure, illustrating spindle drive torque command, spindle angular velocity, upset, and pressure all on the vertical axis versus time represented on the horizontal axis. The graph illustrates the steps of a method for inertia welding together production parts in combination with a predetermined profile calculated from the method graphically illustrated in FIG. 3 in accordance with an embodiment of the present disclosure.

Turning to the torque modulated and upset targeted weld system of FIG. 5, and referring to FIG. 4, the formation of an inertia production weld 118 is shown graphically, wherein in FIG. 5 the horizontal axis represents time and the vertical axis represents various measured values and system commands during formation of the inertia production weld 118, in accordance with an embodiment of the present disclosure. To form the inertia production weld 118, the operator first specifies weld parameters that define an inertia production cycle 120 including the specified amount of upset formation 115 to be experienced by a pair of production parts 120, 128. The operator then loads a pair of production parts 126, 128 (FIG. 1) by engaging the first production part 126 with the rotating chuck 20 (FIG. 1) while engaging the second production part 128 with the non-rotating chuck (FIG. 1). Additionally, the profile 114 (FIG. 4) is then selected. Any number of inertia sample welds 54 (FIGS. 3 and 4) may be executed, and the weld data 112 (FIG. 4) from these inertia sample welds 54 may be compiled into various sample profiles 114 and stored on the CPU 34 (FIG. 2). The profile 114 that is most suitable for the current configuration of production parts 126, 128 is selected from the list of available profiles.

In inertia welding, a base input energy for any given material and geometry must generate enough heat to plasticize sufficient material to allow the upset to form. Since the formation of upset does not start for a period of time after initial contact between the two production parts 126, 128, a parameter must be established to specify when to initiate upset control. This initiation can be started in any suitable way, for example, by employing a turn-on-speed parameter, or a turn-on-upset parameter. The turn-on-speed parameter is a predetermined spindle velocity defined such that when the spindle speed drops below that predetermined value, upset control is initiated. The turn-on-upset parameter is defined such that when the upset increases above the predetermined upset value, upset control is initiated.

The cycle characteristics of the inertia production cycle 120 are identical with the characteristics of the inertia sample cycle 56 through the acceleration phase and until the turn-on-speed or turn-on-upset parameter triggers the initiation of an upset control phase 130 as shown graphically in FIG. 5. Any parameter that affects the deceleration rate of the spindle 18 is unchangeable in the inertia production weld 118, and must be duplicated from the sample inertia weld 54. These parameters include weld speed, brake torque, weld pressure, upset speed, and upset pressure. If these parameters need to be changed, a new sample inertia weld 54 and corresponding profile 114 must be processed and stored. The CPU 34 calculates any additional required parameters based on the parameters input by the operator above and the characteristics of the sample profile 114 selected. All of the parameters, including the profile 114 arrays of upset versus speed are communicated to the logic controller 42 from the CPU 34.

Returning to FIG. 5, the weld system 10 begins inertia friction welding together the pair of production parts 126, 128 to form the inertia production weld 118. After weld parameters such as the specified amount of upset formation 115 are input by the operator and the first production component 126 and the second production part 128 are engaged, the operator then issues a start command 132 for the inertia production cycle 120. After the spindle 18 is accelerated to disengage speed 133 and coasts naturally to weld speed 134, the motion controller 36 then commands the slide actuator 32 to move the slide 30 to contact the opposed meeting faces of the two production parts 126, 128 wherein the production parts 126, 128 have a combined length 138 when production part 128 contacts production part 126. The inertia production cycle 120 proceeds as described above in the inertia sample cycle 56. Since the weld in this example is a torque modulated and upset targeted inertia weld, when the turn-on-speed 136 or the turn-on-upset 172 is reached, the upset control phase 130 initiates. The rotational speed of the spindle 18 decreases, the slide 30 moves toward production part 126, and the formation of upset 140 reduces the combined length 138.

At the core of the application of any upset control technique, is the determination of an upset error. During the upset control phase of simple profile-based upset controlled welds, the motion controller 36 compares actual upset to the upset setpoint dictated by the profile model for the current actual spindle speed to generate an error signal. The actual upset can be subtracted from the upset setpoint to generate an upset error as follows:

UpsetError(142)(*t*)=ProfileUpsetSetpoint(116)(*t*)−
UpsetActual(140)(*t*)   (1)

When the upset setpoints are used directly from the profile in this manner, successful implementation of the upset control technique will result in an inertia weld in which the upset is essentially equal to the upset achieved in the selected profile sample weld. In order to produce an inertia production weld 118 in which the upset formation 115 is different than the upset formation 88 dictated by the profile 114 of the inertia sample weld 54, the upset setpoints 116 at any given speed cannot be used directly from the profile 114. During the inertia production cycle 120 of an upset targeted weld, the upset setpoint 116 from the profile 114 is modified based on the difference between the sample weld final upset 96 and the specified target amount of upset formation 115. The upset setpoint 116 from the profile 114 at any given speed must be modified dynamically to generate a modified upset setpoint 144 (FIG. 4) that will systematically alter the actual upset formation of the production weld 118 and produce the inertia production weld 118 with the specified amount of upset formation 115 which may be different than the upset 88 formed during the inertia sample cycle 56. The modified upset setpoint 144 is calculated by the logic controller 42 from the profile upset setpoint 116, and the logic controller 42 calculates the upset error signal 142 as indicated by formula (2) as follows:

Upset Error (142) (*t*)=Modified Upset Setpoint (144)
(Upset Setpoint(116)(*t*))−Upset Actual(140)(*t*)   (2)

During the upset control phase 130, the motion controller 36 compares actual upset 140 during the inertia production cycle 120 to the modified upset setpoints 144 calculated from the profile 114 for the current actual speed of the spindle 18 to generate an upset error signal 142 as shown in the flowchart of FIG. 4. In the present invention, the profile upset setpoint 116 at any instant in time can be looked up from the arrays of the profile 114 based on current speed of the spindle 18. The profile upset setpoint is then modified based on the target upset. The actual upset 140 occurring during the upset control phase 130 is subtracted from the modified upset setpoint 144 to generate the upset error signal 142 as indicated by formula (2) above.

The upset error signal 142 is then used to generate a command signal that governs a manipulated input that alters the weld process 10 to control the upset formation 140 of the pair of production parts 126, 128 to achieve the specified amount of upset formation 115. As such, the upset error signal 142 may change or control the magnitude of the manipulated variable 146. Modulating input 146 applied to production parts 126, 128 may be based on the comparison of the data related to the rotational deceleration of the spindle 18 and the movement of the slide 30 with the profile 114. FIG. 5 illustrates a weld process example where the torque applied to the spindle by the drive motor is the manipulated variable that is modulated to control upset. If the actual upset formation 140 during the inertia production weld cycle 120 is less than the modified upset setpoint 144 at any given speed, the drive 24 applies positive torque 150 to the spindle 18. If the upset formation 140 during the inertia production weld cycle 120 is greater than the modified upset setpoint 144 at any given speed, the drive 24 applies negative torque 152 to the spindle 18. The upset error signal 142 is driven into a PID algorithm (Proportion-Integral-Derivative) producing a torque command 154 (FIG. 4) to compensate for the upset error signal 142.

The closed loop control algorithm for generating the torque command 154 signal based on the current upset error signal 142 is implemented in a standard digital independent positional PID algorithm with derivative on error. This torque command 154 is described mathematically in formula (3) for the inertia production cycle 120 as follows:

$$\text{Torque Command}(154)(t) = K_p e(t) + K_i \sum_0^n e \, dt + K_d \frac{de}{dt} + BIAS \quad (3)$$

where e(t)=Upset Error (142)
$K_p$=Proportional gain, an operator input
$K_i$=Integral gain, an operator input $K_d$=Derivative gain, an operator input BIAS=Profile Brake Torque Command, specified in selected profile 114

Figure 6:
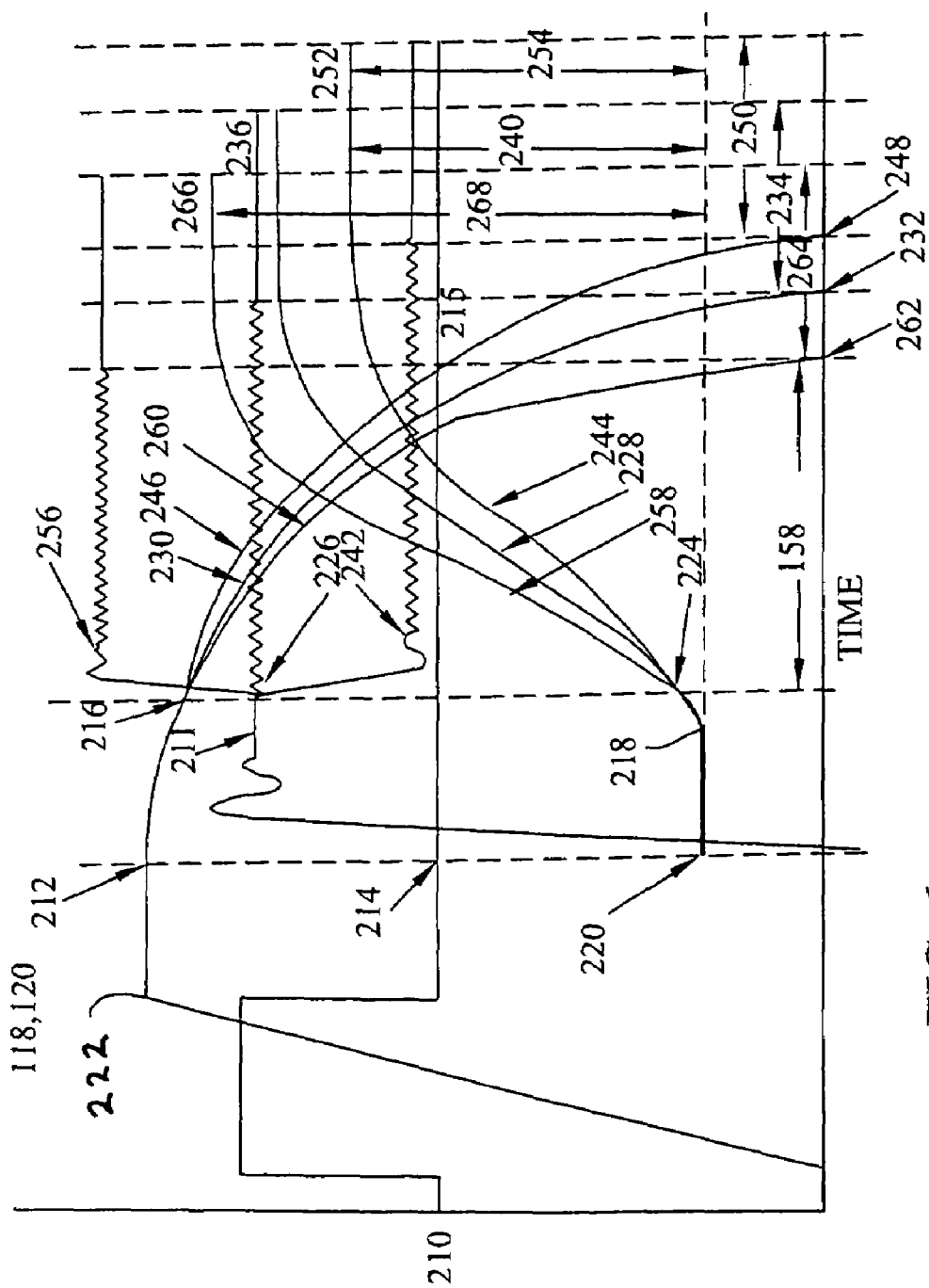
FIG. 6 is a graph based on data relating to the formation of three pressure modulated and upset targeted production inertia welds formed by inertia friction welding utilizing a constant weld speed algorithm in accordance with an embodiment of the present disclosure, illustrating spindle drive torque command, spindle angular velocity, upset, and pressure all on the vertical axis versus time represented on the horizontal axis. The graph illustrates the steps of a method for inertia welding together production parts in combination with a predetermined profile calculated from the method graphically illustrated in FIG. 3 in accordance with an embodiment of the present disclosure.

The present disclosure may also be applied in a pressure modulated and upset targeted inertia production weld cycle 120. In this cycle, the upset error signal 142 is used to modulate input 146 applied to production parts 126, 128. As noted, modulating input 146 applied to production parts 126, 128 may be based on comparison of the data related to the rotational deceleration of the spindle 18 and the movement of the slide 30 with profile 114. In an embodiment, FIG. 6 illustrates a weld process example where the pressure applied between the production parts is the manipulated variable that is modulated to control upset. If the upset formation 140 formed is less than the modified upset setpoint 144 at any given speed, the slide actuator 32 increases the pressure. If the actual upset formation 140 formed is greater than the modified upset setpoint 144 at any given speed, the slide actuator 32 reduces the pressure. In the illustrated embodiment, the upset error signal 142 is driven into a PID algorithm (Proportion-Integral-Derivative) producing a pressure command 154 signal (FIG. 4) which relates to the modulated pressures 226 or (242, 256) (FIG. 6) to compensate for the upset error signal 142.

Since the inertia weld system 10 (FIG. 1) may employ hydraulic thrust generation, pressure modulated upset control is implemented in a standard digital independent positional PID algorithm with derivative on error as denoted in formula (4) as follows.

$$\text{Pressure Command}(164)(t) = K_p e(t) + K_i \sum_0^n e\,dt + K_d \frac{de}{dt} + BIAS \quad (4)$$

where e(t)=Upset Error 142

$K_p$=Proportional gain, an operator input $K_i$=Integral gain, an operator input $K_d$=Derivative gain, an operator input BIAS=Profile Pressure Target, specified in selected profile 114

This pressure modulated command signal 154 may then be inputted into the pressure control loop to control pressure.

In order to dynamically target a specified amount of upset formation 115 that is different than the upset formation 88 of the welded sample parts 22, 28 defined in the selected profile 114, the modified upset setpoint 144 must be generated for any given spindle speed, during the deceleration of the inertia production weld 118 from the profile upset setpoint 116 for that speed. To accomplish this, algorithms such as a constant weld speed algorithm or a variable weld speed algorithm, or others, may be used to calculate the modified upset setpoint from the selected profile. The first algorithm presented in this discussion is the constant weld speed algorithm. As previously stated, a base input energy for any given material and geometry must generate enough heat to plasticize sufficient material to allow upsetting to occur. Applying this concept to an upset versus speed relationship, the upset error signal 142 that will produce an inertia weld with the specified amount of upset formation 115 can be achieved as described in formulas (5), (6) and (7) as follows.

$$\Delta\text{Upset} = \text{Target Upset 115} - \text{Sample Weld Upset 88} \quad (5)$$

Let ω=spindle angular velocity $K_U$=Ratio of Total Kinetic Energy Used versus Kinetic Energy Available for Upset $\omega_b$=spindle angular velocity after base energy input; i.e. where upset begins $\omega_z$=spindle angular velocity when weld seizure occurs; i.e. Scaling Zero Speed k=Spindle-speed-to-index scaling factor $\omega_t$=turn on spindle angular velocity $u_t$=turn on upset Once ω<$\omega_t$, if using the turn-on speed parameter, or when Upset 140 (t)>$u_t$, if using the turn-on upset parameter, the algorithms of the present disclosure examine the ratio of how much energy has been used in the formation of upset versus the energy available for upset. The scaling zero speed parameter, $\omega_z$, defines the lower bound of the energy available for upset. The incorporation of a scaling zero speed allows the algorithms to handle applications in which there exists a spindle speed below which there is a constant upset formation at the end of the weld that is independent of starting energy. In these applications, all of the specified ΔUpset must be achieved during the production weld as the spindle decelerates from $\omega_b$ to $\omega_z$. The upset that occurred during the profile weld after the spindle speed reached $\omega_z$ will be duplicated in the production weld during the same period.

Since upset is proportional to energy, the ratio of the energy that has been used in the formation of upset versus the energy available for upset can be multiplied by ΔUpset and added to the profile upset setpoint 116 in order to calculate the modified upset setpoint 144 for the given spindle speed as follows:

$$K_U(t) = \begin{cases} 0 & \text{if } \omega \geq \omega_b \\ ((\omega_b^2 - \omega(t)^2)/\omega_b^2 - \omega_z^2) & \text{if } \omega_b > \omega \geq \omega_z \\ 1 & \text{if } \omega \leq \omega_z \end{cases} \quad (6)$$

i) since K=½Iω² ii) where K=kinetic energy of a rotating rigid body, and iii) I is the moment of Inertia.

$$\text{Modified Upset Setpoint } 144(t) = \text{Upset Setpoint116} \\ [k\omega(t)] + (K_U(t) * \Delta\text{Upset}) \quad (7)$$

$$\text{Upset Error}142(t) = \text{Modified Upset}144(t) - \text{Actual Upset}140(t) \quad (8)$$

Thus modifying the profile 114 comprises generating the modified setpoint 144 for each speed index of the spindle 18 during the inertia friction welding of the pair of production parts 126, 128 based on: the upset setpoint 116 of the profile 114 for the current speed of the spindle 18, the final profile upset 96 and the specified amount of upset formation 115. Calculating the difference between the upset formation resulting from the inertia friction welding of the pair of production parts with the upset setpoint calculated from the modified profile comprises comparing upset formation of the pair of production parts with each upset setpoint of the modified profile at various instances of time during the inertia friction welding of the pair of production parts. As such, the input 146 is applied to the weld process 10 during the formation of the inertia production weld 118. As such, modulating the input 146 applied to the pair of production parts 126, 128 based on the modified profile 114 during the inertia friction welding of the pair of production parts 126,

128 controls the upset formation 140 of the pair of production parts 126, 128 to experience the specified amount of upset formation 115.

Referring back to the illustration of a torque modulated and upset targeted weld utilizing the constant weld speed algorithm shown in FIG. 5, once contact of the meeting faces occurs, upset zero position 168 is established. In addition, when this contact occurs pressure can build to weld pressure 170. Also at this time, the drive 24, typically continues commanding zero torque 166 to the spindle 18. Alternatively, the drive 24 can apply a positive or negative torque at this time dependent on the braking torque of the profile 114 and thus increase or decrease the energy to be dissipated into the inertia production weld 118, respectively. The contact of the meeting faces puts a torque load on the spindle 18 due to the frictional weld torque between the two parts 126, 128. This causes the spindle 18 to decelerate throughout the inertia production cycle 120.

Since the inertia production weld 118 is a torque modulated and upset targeted inertia weld, the upset experienced by the production parts 126, 128 can be specified. The upset control phase 130 initiates when the turn-on upset 172 or the turn-on speed 136 is reached. FIG. 5 illustrates three possible examples of targeted upset formation, nominal upset [ΔUpset=0], reduced upset [ΔUpset<0], and increased upset [ΔUpset>0]. All three examples are illustrated with a profile braking torque of zero.

In the nominal upset example, the logic controller 42 starts modulating the drive torque 148 applied to the spindle 18 via the motion controller 36 to match the actual upset with the modified upset setpoint 144 as the weld process progresses. As such, in response to the upset error 142 (FIG. 4), the logic controller 42 provides the torque command 154 (FIG. 4) issued to the drive 24. With a zero change in target upset, as compared to the inertia sample cycle 56, the torque modulation may behave according to the torque modulation of U.S. patent application Ser. No. 10/924,633 for the inertia production cycle 120. As such, the upset 140 will typically follow the nominal upset 174 duplicating the upset 88 (FIG. 3) experienced during the inertia sample cycle 56 (FIG. 3). The spindle deceleration will typically follow the nominal deceleration 176 or deceleration 84 (FIG. 3) of the inertia sample cycle 56.

During this deceleration 176, the logic controller 42 is repeatedly comparing the modified upset setpoint 144 to actual upset 174 and modulating drive torque 148 applied to the spindle 18 to attempt to match modified upset setpoint 144 and actual upset 174 as indicated by the sinusoidal oscillation of drive torque 148. Once the spindle 18 is at zero velocity 178, the drive 24 commands zero torque 167 to the spindle 18. At zero velocity 178, a cooling dwell period 180 initiates where weld pressure 170 (or upset pressure) is maintained for a predetermined period of time wherein the upset 174 may continue to increase. A final upset position 182 is determined at the end of the cooling dwell period 180 after the movement of the slide 32 toward the spindle 18 ceases. A final upset 184 of the inertia production weld 118 can be calculated based on the difference between the upset zero position 168 and the final upset position 182. The final upset 184 relates to the displacement of the slide 30 caused by upset 174 during the inertia production cycle 120. Accordingly, the inertia production cycle 120 controls upset 174 to achieve the specified amount of upset formation 115.

Still referring to FIG. 5, when the inertia production weld 118 is a torque modulated and upset targeted inertia weld in which the specified upset formation is less than the upset formation in the selected profile 114, the upset control phase 130 initiates when the turn-on upset 172 or the turn-on speed 136 is reached. In the reduced upset example, the logic controller 42 provides the torque command 154 (FIG. 4) based on upset error 142 (FIG. 4) which starts modulating negative torque 152 applied to the spindle 18 via the motion controller 36 in order to match the actual upset with the modified upset setpoint 144 as the weld process progresses. The drive 24 provides the negative torque 152 to the spindle 18 and, thus, redirects energy away from the inertia production weld 118. As less energy is going into the inertia production weld 118, the actual upset 186 experienced during the upset control phase 130 will be less than the nominal upset 174 or the upset 88 experienced during the inertia sample cycle 56 (FIG. 3). The spindle deceleration 188 will occur faster and be below nominal deceleration 176 or sample deceleration 84 (FIG. 3), since the spindle 18 is being driven with negative torque 152.

During this deceleration 188, the logic controller 42 is repeatedly comparing the modified upset setpoint 144 to actual upset 186 and modulating the drive torque 152 to attempt to match modified upset setpoint 144 and actual upset 186 and indicated by the sinusoidal oscillation of drive torque 152. Since less upset 186, as defined by the specified amount of upset formation 115 inputted by the operator, is being targeted than the upset 88 relating to profile 114, the torque command 152 will tend to stay negative. Once the spindle 18 is at zero velocity 190, which will occur before zero velocity 178 of the nominal upset controlled weld, the drive 24 commands zero torque 167 to the spindle 18. At zero velocity 190, a cooling dwell period 192 is initiated where weld pressure 170 (or upset pressure) is maintained for a predetermined period of time wherein the upset 186 may continue to increase. A final upset position 194 is determined at the end of the cooling dwell period 192 after the movement of the slide 32 toward the spindle 18 ceases. A final upset 196 of the product weld can be calculated based on the difference between the upset zero position 168 and the final upset position 194. As such, the final upset 196 relates to the displacement of the slide 30 caused by the formation of upset 186 during the inertia production cycle 120. Accordingly, the inertia production cycle 120 controls upset 186 to achieve the specified amount of upset formation 115.

Still referring to FIG. 5, when the inertia production weld 118 is a torque modulated and upset targeted inertia weld in which the specified upset formation is greater than the upset formation in the selected profile, the upset control phase 130 initiates when the turn-on upset 172 or the turn-on speed 136 is reached. In the increased upset example, the logic controller 42, in response to the upset error 142 (FIG. 4), provides the torque command 154 (FIG. 4) which starts modulating positive torque 150 applied to the spindle 18 via the motion controller 36 to match the actual upset with the modified upset setpoint 144 as the weld process progresses. The drive 24 provides the positive torque 150 to the spindle 18 and, thus, increases the energy to be dissipated in the inertia production weld 118. As more energy is going into the inertia production weld 118, the upset 198 experienced during the modulated phase 130 will be greater than the nominal upset 174 or upset 88 experienced during the inertia sample cycle 56 (FIG. 3). The spindle deceleration 200 will occur slower and be above nominal deceleration 176 or sample deceleration 84 (FIG. 3), since the spindle 18 is being driven with positive torque 150.

During this deceleration 200, the logic controller 42 is repeatedly comparing the modified upset setpoint 144 to actual upset 198 and modulating drive torque 150 to attempt to match modified upset setpoint 144 and actual upset 198 as indicated by the sinusoidal oscillation of torque 150. Since more upset 198 as defined by the specified amount of upset formation 115 inputted by the operator, is being targeted than the upset 70 relating to profile 114, the applied torque 150 will tend to stay positive. Once the spindle 18 is at zero velocity 202 which will occur after zero velocity 178 of the nominal upset controlled weld, the drive 24 commands zero torque 167 to the spindle 18. At zero velocity 202, a cooling dwell period 204 is initiated where weld pressure 170 (or upset pressure) is maintained for a predetermined period of time wherein the upset 198 may continue to increase. A final upset position 206 is determined at the end of the cooling dwell period 204 after the movement of the slide 32 toward the spindle 18 ceases. A final upset 208 of the product weld can be calculated based on the difference between the upset zero position 168 and the final upset position 206. As such, the final upset 208 relates to the displacement of the slide 30 caused by the formation of upset 198 during the inertia production cycle 120. Accordingly, inertia production cycle 120 controls upset 198 to achieve the specified amount of upset formation 115.

The method described above in connection with the formation of the production inertia weld 118 may be subsequently repeated to weld together on a volume basis any number of additional production parts.

Referring to FIG. 6, the weld system 10 begins inertia friction welding together a pair of production parts 126, 128 (FIG. 1) to form the inertia production weld 118 wherein the constant weld speed algorithm in an embodiment of the present disclosure modulates pressure during the inertia production cycle 120. After weld parameters such as the specified amount of upset formation 115 are inputted by the operator, the operator then issues a start command 210 for the inertia production cycle 120. The inertia weld cycle starts and proceeds as described above in the inertia sample cycle 56.

Once the spindle 18 has been accelerated to the disengage speed 211 and the drive torque 214 is set to zero, the spindle 18 is rotating free from any influence from the drive 24, and is decelerating at a rate dependent on the inertia and frictional losses inherent in the system 10. Once the spindle 18 naturally decelerates to weld speed 212, the system 10 commands the slide actuator 32 to move the slide 30 to bring the meeting faces of the two production parts 126, 128 into contact wherein the production parts 126, 128 have the combined length 138 when production part 128 contacts production part 126. This contact results in deceleration of the spindle 18, movement of the slide 30 and the formation of upset 218 as the slide 30 moves the meeting faces of the two production parts 126, 128 together. Once contact of the meeting faces occurs, upset zero position 220 is established. In addition, when this contact occurs axial pressure can build to weld pressure 222. Also at this time, the drive 24, typically continues commanding zero torque 214 to the spindle 18. Alternatively, the drive 24 can apply a positive or negative torque (not shown) at this time dependent on the braking torque of the profile 114 and thus increase or decrease the energy going into the inertia production weld 118, respectively.

The contact of the meeting faces puts a torque load on the spindle 18 due to the frictional weld torque between the two production parts 126, 128. This causes the spindle 18 to decelerate throughout the inertia production cycle 120. At a predetermined "upset speed", the weld system 10 can increase the axial load on the two production parts 126, 128, and thus increase to an "upset pressure" (not shown).

Since in this example the inertia production weld 118 is a pressure modulated and upset targeted inertia weld, the upset control phase 158 initiates when the turn-on upset 224 or the turn-on speed 216 is reached. FIG. 6 illustrates three possible examples of targeted upset formation, nominal upset [ΔUpset=0], reduced upset [ΔUpset<0], and increased upset [ΔUpset>0]. These examples are illustrated with a profile braking torque of zero.

In the nominal upset example, the logic controller 42 starts modulating the pressure 226 applied to the slide 30 in order to match the actual upset with the modified upset setpoint 144 as the weld process progresses. As such, in response to the upset error 142 (FIG. 4) the logic controller 42 provides the pressure command 154 (FIG. 4) which controls the pressure 226 applied to the slide 30. With a zero change in target upset, as compared to the inertia sample cycle 56, the upset 218 will typically follow the nominal upset 228 or upset 88 of the inertia sample cycle 56 (FIG. 3) while the spindle deceleration will typically follow the nominal deceleration 230 or deceleration 84 of the sample inertia weld 54 (FIG. 3).

During this deceleration 230, the logic controller 42 is repeatedly comparing the modified upset setpoint 144 to actual upset 228 and modulating axial pressure to attempt to match modified upset setpoint 144 and actual upset 228 as indicated by the sinusoidal oscillation of the axial pressure 226. Once the spindle 18 is at zero velocity 232, the drive 24 commands zero torque 215 to the spindle 18. At zero velocity 232, a cooling dwell period 234 initiates where weld pressure 222 (or upset pressure) is maintained for a predetermined period of time wherein the upset 228 may continue to increase. A final upset position 236 is determined at the end of the cooling dwell period 234 after the movement of the slide 32 toward the spindle 18 ceases. A final upset 240 of the inertia production weld 118 can be calculated based on the difference between the upset zero position 220 and the final upset position 236. The final upset 240 relates to the displacement of the slide 30 caused by upset 228 during the inertia production cycle 120. Accordingly, inertia production cycle 120 controls upset 228 to achieve the specified amount of upset formation 115.

Still referring to FIG. 6, when the inertia production weld 118 is a pressure modulated and upset targeted inertia weld in which the specified upset formation is less than the upset formation in the selected profile, the upset control phase 158 initiates when the turn-on upset 224 or the turn-on speed 216 is reached. In the reduced upset example, the logic controller 42 provides the pressure command 154 (FIG. 4) based on the upset error signal 142 (FIG. 4) which starts modulating the pressure by reducing the pressure 242 applied to the slide 30 in order to match the actual upset with the modified upset setpoint 144 as the weld process progresses. This reduced pressure 242 reduces the normal force acting on the part with a corresponding reduction of the frictional force which reduces the net torque on the two contacting production parts 126, 128. This reduced pressure 242 which may be in the form of axial pressure controls the rate of energy conversion of the inertia production weld 118. As a result, the upset 244 will be less than the nominal upset 228 or the upset 88 experienced during the inertia sample cycle 56 (FIG. 3). The spindle deceleration 246 will occur slower and be above the nominal deceleration 230 or sample deceleration 84 (FIG. 3), since the reduced pressure 242 reduces the weld torque on the production parts 126, 128.

During this deceleration 246, the logic controller 42 is repeatedly comparing the modified upset setpoint 144 to actual upset 244 and modulating pressure to attempt to match modified upset setpoint 144 and actual upset 244 as indicated by the sinusoidal oscillation of the reduced pressure 242. But since less upset 244, as defined by the specified amount of upset formation 115 inputted by the operator, is being targeted than the profile 114, the reduced pressure 242 will tend to stay lower than the nominal pressure 226. Once the spindle 18 is at zero velocity 248 which will occur after zero velocity 232 of the nominal upset controlled weld, the drive 24 commands zero torque 215 to the spindle 18. At zero velocity 248, a cooling dwell period 250 is initiated where weld pressure 222 (or upset pressure) is maintained for a predetermined period of time wherein the upset 228 may continue to increase. A final upset position 252 is determined at the end of the cooling dwell period 250 after the movement of the slide 30 toward the spindle 18 ceases. A final upset 254 of the product weld can be calculated based on the difference between the upset zero position 220 and the final upset position 252. As such, the final upset 254 relates to the displacement of the slide 30 caused by the formation of upset 244 during the inertia production cycle 120. Accordingly, inertia production cycle 120 controls upset 244 to achieve the specified amount of upset formation 115.

Still referring to FIG. 6, when the inertia production weld 118 is a pressure modulated and upset targeted inertia weld in which the specified upset formation is greater than the upset formation in the selected profile, the upset control phase 158 initiates when the turn-on upset 224 or the turn-on speed 216 is reached. In the increased upset example, the logic controller 42 provides the pressure command 154 (FIG. 4) which starts modulating pressure 256 by increasing the pressure, in response to the upset error signal 142 (FIG. 4), applied to the slide 30 in order to obtain the specified amount of upset formation 115. This increased pressure 256 increases the normal force acting on the part with a corresponding increase in the frictional force which increases the weld torque on the two contacting production parts 126, 128. As a result, upset 258 will be greater than the nominal upset 228 or upset 88 experienced during the inertia sample cycle 56 (FIG. 3). The spindle deceleration 260 will occur faster and be below nominal deceleration 230 deceleration 84 of the inertia sample cycle 56 (FIG. 3), since the increased axial pressure increases the weld torque on the production parts 126, 128.

During this deceleration 260, the logic controller 42 is repeatedly comparing the modified upset setpoint 144 to actual upset 258 and modulating pressure to attempt to match modified upset setpoint 144 and actual upset 258 as previously described and indicated by the sinusoidal oscillation of the increased pressure 256. But since more upset 258, as defined by the specified amount of upset formation 115 inputted by the operator, is being targeted than the profile 114, the increased pressure 256 will tend to stay higher than the nominal pressure. Once the spindle 18 is at zero velocity 262 which will occur before zero velocity 232 in the nominal weld, the drive 24 commands zero torque 215 to the spindle 18. At zero velocity 262, a cooling dwell period 264 initiates where weld pressure 222 (or upset pressure) is maintained for a predetermined period of time wherein the upset 258 may continue to increase. A final upset position 266 is determined at the end of the cooling dwell period 264 after the movement of the slide 30 toward the spindle 18 ceases. A final upset 268 of the product weld can be calculated based on the difference between the upset zero position 220 and the final upset position 266. As such, the final upset 268 relates to the displacement of the slide 30 caused by the formation of upset 258 during the inertia production cycle 120. Accordingly, inertia production cycle 120 controls upset 258 to achieve the specified amount of upset formation 115.

The method described above in connection with the formation of the production inertia weld may be subsequently repeated to weld together on a volume basis any number of additional production parts.

The constant weld speed algorithm of the present disclosure reiies on the upset control technique to either supply or remove the energy necessary to account for the difference in upset formation between the production weld and the sample weld from the welding system since both the sample weld and the production weld start with the same initial energy. The variable weld speed algorithm of the present disclosure estimates the difference in energy required to achieve the targeted upset. The system 10 then modifies the weld speed of the production weld to incorporate this energy difference.

In using the variable speed algorithm, the contributions from the upset control technique will be less than the contributions needed when using the constant weld speed algorithm since the initial energy is much closer to the energy required to achieve the specified amount of upset formation. Both algorithms utilize looking up a profile upset setpoint given the current actual spindle speed, and then dynamically modifying that profile setpoint in such a way that the production weld finishes with the targeted amount of upset formation. In using the variable weld speed algorithm, a relationship between current speed in the production weld and the corresponding speed in the sample weld must be established in order to be able to look up the profile upset setpoint given the current speed. Additionally, the relationship between sample weld upset setpoints and dynamic production weld upset setpoints must be established.

If multiple non-upset-controlled welds are made at the same inertia but at different starting energies (proportional to weld speed squared), the resultant upsets formed can be modeled with a linear relationship between upset and energy. This relationship can be predetermined and specified by the operator so that the logic controller can estimate starting energy and adjust the weld speed of the production weld based on the targeted amount of upset formation as follows:

Given i) $KE = \frac{1}{2}I\omega^2$ ii) where KE=kinetic energy of a rotating rigid body, and iii) I is the moment of Inertia, and iv) Upset∝KE at weld speed, Let $U_K$=Proportionality Ratio Of $\Delta$Upset to $\Delta(\omega^2)$ $\omega_{wp}$=weld speed for sample (profile) weld $\omega_{wu}$=weld speed for production (upset targeted) weld Therefore, $(\omega_{wu}^2 - \omega_{wp}^2)U_K + \text{ProfileFinalUpset} = \text{Target Upset}$ and $$\omega_{wu} = \sqrt{\frac{\text{Target Upset} - \text{ProfileFinalUpset}}{U_K} + \omega_{wp}^2} \quad (9)$$

One of the objects of the variable weld speed algorithm is to adjust the weld speed so that if the production weld were executed without upset control, the resulting upset would be naturally closer to the target upset than the upset dictated by the selected profile. This minimizes the corrections and adjustments required when the upset control technique is applied. An empirical linear relationship between energy and upset as described above in Equation (9) is just one of the possible ways to estimate the required weld speed based on the difference between the profile final upset and the targeted upset. Other procedures may be used to estimate the starting energy and adjust the weld speed based on the targeted upset.

Once the inertia weld cycle is initiated, upset formation, in the absence of any upset control techniques would still be an uncontrolled result of the weld process, and therefore the accuracy of the final part length varies with inherent upset variability. But, by utilizing an upset control technique in combination with a dynamic change to the profile, upset formation could then be targeted and controlled during the deceleration of the spindle. This can be done as follows:

Let $\omega_{bp}$=spindle velocity after base energy input; i.e. where upset formation begins in sample (profile) weld $\omega_{bu}$=spindle velocity after base energy input; i.e. where upset formation begins in production (upset targeted) weld $\omega_{tp}$=turn on spindle angular velocity for sample (profile) weld $\omega_{tu}$=turn on spindle angular velocity for production (upset targeted) weld $u_t$=turn on upset parameter $\omega_u$=spindle angular velocity of production (upset targeted) weld $\omega_p$=spindle angular velocity of sample (profile) weld $\omega_z$=spindle angular velocity when weld seizure occurs; i.e. Scaling Zero Speed $K_U$=Ratio of Total Kinetic Energy Used versus Kinetic Energy Available for Upset Formation k=Spindle-speed-to-index scaling factor for sample (profile) weld The spindle angular velocity after base energy input, $\omega_{bp}$, is determined empirically from the data of the profile. Equating the energy differences from weld speed to the base energy input velocity in both the sample and production welds yields:

$$\left(\frac{1}{2}I\omega_{wp}^2 - \frac{1}{2}I\omega_{bp}^2\right) = \left(\frac{1}{2}I\omega_{wu}^2 - \frac{1}{2}I\omega_{bu}^2\right) \quad (10)$$

Rearranging and solving for $\omega_{bu}$ $$\omega_{bu} = \sqrt{\omega_{wu}^2 - \omega_{wp}^2 + \omega_{bp}^2} \quad (11)$$

This calculation establishes the relationship between the spindle velocities of the sample weld and the production weld. If the result is indeterminate, then there is not enough energy to start upset formation and an upset targeted production weld cannot occur.

Similarly, if using the turn on speed parameter, the corresponding turn on speed parameter for the upset controlled production weld can be calculated by equating the energy differences between the weld speed and turn on velocity in both the sample and production weld. This yields:

$$\omega_{tu} = \sqrt{\omega_{wu}^2 - \omega_{wp}^2 + \omega_{tp}^2} \quad (12)$$

This establishes the relationship between the turn-on velocities of the sample weld and the upset targeted production weld. If the result is indeterminate, then there is not enough energy to start upset formation and an upset targeted production weld cannot occur.

The relationship between any given speed in the production weld and the corresponding speed in the sample weld is established by equating the energy consumed, on a percent energy available for upset formation basis, for the sample and production welds. This is utilized only after the upset control phase of the appropriate upset control technique is initiated. Just as was discussed in the constant weld speed algorithm, the scaling zero speed parameter, $\omega_z$, defines the lower bound of the energy available for upset.

$$\frac{\omega_{bu}^2 - \omega_u(t)^2}{(\omega_{bu}^2 - \omega_z^2)} = \frac{\omega_{bp}^2 - \omega_p(t)^2}{(\omega_{bp}^2 - \omega_z^2)} \quad (13)$$

Rearranging, and solving for $\omega_p(t)$ yields $$\omega_p(t) = \sqrt{\frac{\omega_u(t)^2(\omega_{bp}^2 - \omega_z^2) + \omega_{bu}^2\omega_z^2 - \omega_{bp}^2\omega_z^2}{(\omega_{bu}^2 - \omega_z^2)}} \quad (14)$$

This enables the look up of the profile upset setpoints, indexed by speeds that correspond to the sample weld, from speeds that correspond to the upset targeted production weld. Thus, the proportion of total upset generated in the sample weld at the given level of consumed energy available for upset can be used to calculate the modified upset setpoint based on the targeted amount of upset formation as follows:

For spindle angular velocity, $\omega_b > \omega > \omega_z$,

Modified Upset $SP144(t) =$ (15)

$$\left(\frac{\text{Profile Upset } 116[k\omega_p(t)]}{\text{Profile Upset } 116@\omega_z}\right)(\Delta \text{Upset} + \text{Profile Upset } 116@\omega_z)$$

For spindle angular velocity, $\omega \leq \omega_z$,

Modified Upset $SP144(t)$=Upset Setpoint $116[k\omega_p(t)]+\Delta$Upset (16)

and

Upset Error$142(t)$=Modified Upset $SP144(t)$−UpsetActual$(t)$ (17)

This resultant upset error signal 142 can then be driven into the appropriate PID loop for an upset targeted production weld.

Figure 7:
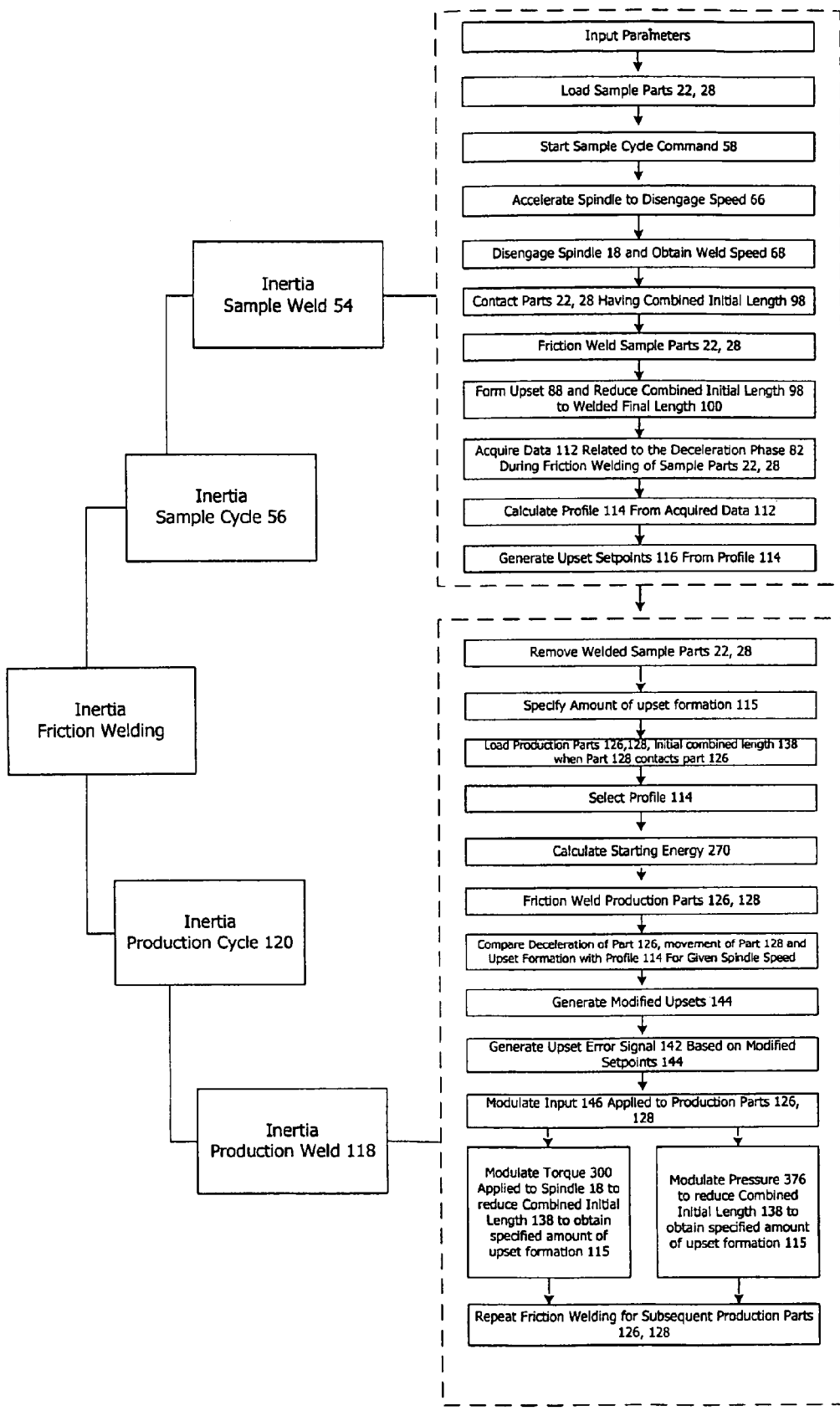
FIG. 7 is a flowchart illustrating steps of a method for welding together parts during formation of the inertia sample weld of FIG. 3, and illustrating steps of a method for welding together production parts based on the data acquired during the formation of the inertia sample weld of FIG. 3 utilizing the variable weld speed algorithm in accordance with an embodiment of the present disclosure.

Turning to FIG. 7, a flowchart illustrates steps of the inertia sample cycle 56 for the formation of the inertia sample weld 54 which follows the process as previously discussed. As illustrated, the system 10 (FIG. 1) calculates the profile 114 for the compiled data 112 in order to generate unmodified upset setpoints 116 from the profile 114 as previously described. Under the variable weld speed algorithm of the present disclosure, however, the flowchart illustrates further steps involved in the inertia production cycle 120 to produce the inertia upset targeted production weld 118.

Prior to initiating the inertia production cycle 120, the operator specifies parameters including the specified amount of upset formation 115 and loads the production parts 126, 128 for processing under the variable weld speed algorithm. The operator then selects the appropriate profile 114. Upon selection of the profile 114, the logic controller 42 calculates the estimated starting energy 270 required for achieving the specified amount of upset formation. The starting energy defines the disengage speed and weld speed for the inertia production weld cycle.

Figure 8:
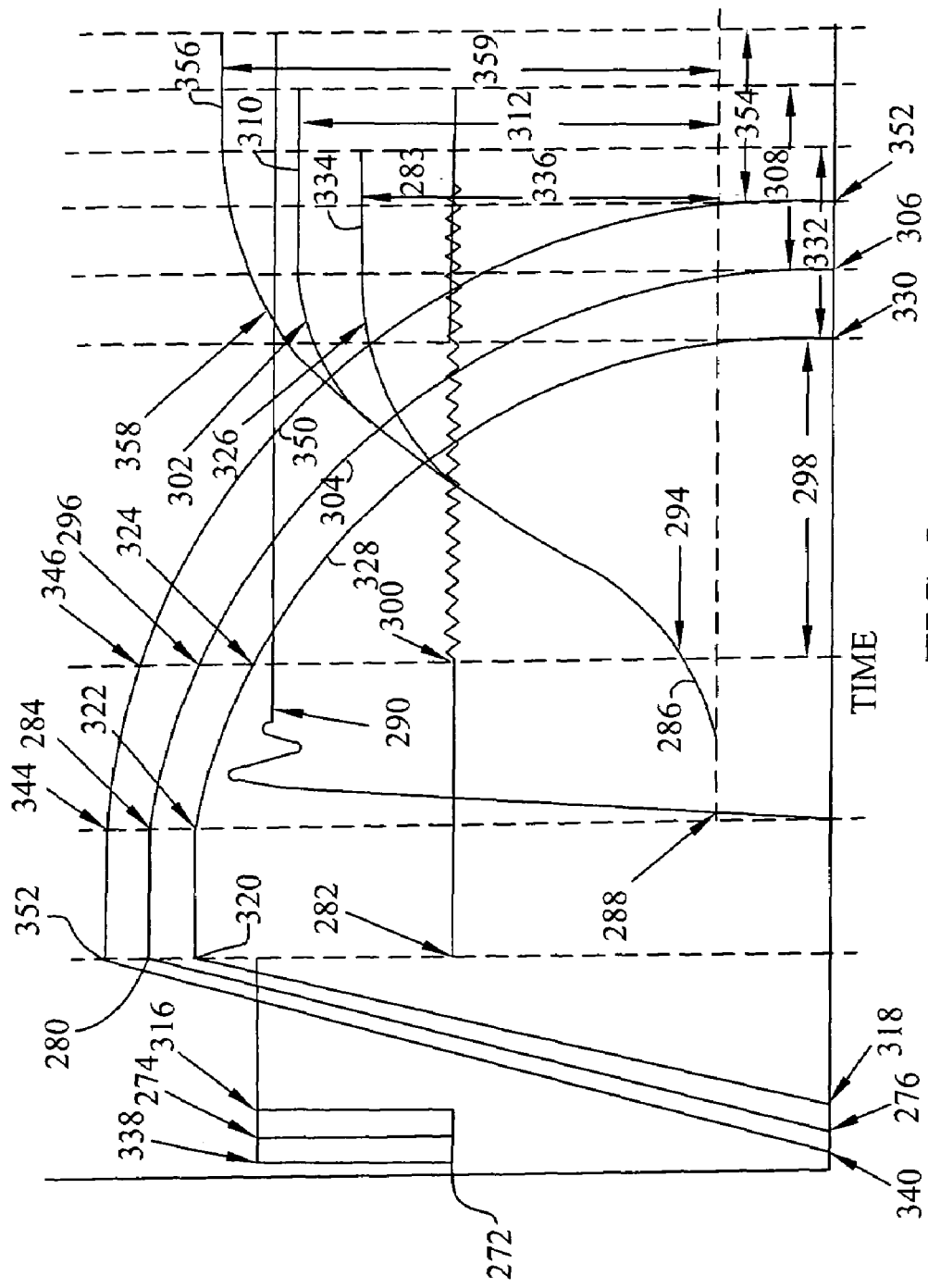
FIG. 8 is a graph based on data relating to the formation of three torque modulated production inertia welds formed by inertia friction welding utilizing a variable weld speed algorithm in accordance with an embodiment of the present disclosure, illustrating with spindle drive torque command, spindle angular velocity, upset, and pressure all on the vertical axis versus time represented on the horizontal axis. The graph illustrates the steps of a method for inertia welding together production parts in combination with a predetermined profile calculated from the method graphically illustrated in FIG. 3 in accordance with an embodiment of the present disclosure.

Referring to FIG. 8, the weld system 10 (FIG. 1) begins inertia friction welding together the pair of production parts 126, 128 (FIG. 1) to form the inertia production weld 118 wherein the variable weld speed algorithm of the present disclosure modulates torque during the inertia production cycle 120. After weld parameters such as the specified amount of upset formation 115 (FIG. 7) are input by the operator, the operator then issues the start command 272. The weld system 10 (FIG. 1) begins inertia friction welding together a pair of production parts 126, 128 (FIG. 1) to form the inertia production weld 118.

FIG. 8 illustrates three examples of targeted upset formation, nominal upset [ΔUpset=0], reduced upset [ΔUpset<0], and increased upset [ΔUpset>0]. All three examples are illustrated with a profile braking torque of zero. FIG. 8 presents the three inertia production welds 118 with their associated time bases shifted in order to align the start of the welds in time on the graph. In other words, since the three inertia production welds 118 are accelerated to different disengage speeds, based on the calculated starting energy 270, the time scales have been shifted so that the end of the acceleration of each inertia production welds 118 occurs at the same point on the time axis.

In the nominal upset example, the drive 24 applies torque 274 to accelerate the spindle to the adjusted disengage speed 280. Once the spindle 18 has been accelerated to the disengage speed 280 and the drive 24 commands zero torque 282 to the spindle 18, the spindle 18 is rotating free from any influence from the drive 24, and is decelerating at a rate dependent on the inertia and frictional losses inherent in the system 10. Once the spindle 18 decelerates naturally to a preset weld speed 284, the weld system 10 commands the slide actuator 32 to move the slide 30 to bring the meeting faces of the two production parts 126, 128 into contact wherein the production parts 126, 128 have combined length 138 when production parts 128 contacts production part 126. This contact results in deceleration of the spindle 18 and the formation of upset 286 as the slide 30 moves the meeting faces of the two production parts 126, 128 together. Once contact of the meeting faces occurs, upset zero position 288 is established. In addition, when this contact occurs pressure can build to weld pressure 290. Also at this time, the drive 24, typically continues commanding zero torque 282 to the spindle 18. Alternatively, the drive 24 can apply a positive or negative torque at this time dependent on the braking torque of the profile 114.

The contact of the meeting faces puts a torque load on the spindle 18 due to the frictional weld torque between the two production parts 126, 128. This causes the spindle 18 to decelerate throughout the inertia production cycle 120. At a predetermined "upset speed", the weld system 10, can increase the axial load on the two production parts 126, 128, and, thus, increase to an "upset pressure" (not shown).

Since the inertia production weld 118 is a torque modulated and upset targeted inertia weld in which the specified upset formation is equal to the upset formation in the selected profile, the upset control phase 298 is initiated when the turn-on upset 294 or the turn-on speed 296 is reached. In the nominal upset case, the logic controller 42 starts modulating the torque 300, in response to the upset error 142 (FIG. 7), via the motion controller 36 to match the actual upset with the modified upset setpoint 144 as the weld process progresses. With a zero change in targeted upset, as compared to the inertia sample cycle 56, the torque modulation may behave according to the torque modulation of a pending U.S. patent application Ser. No. 10/924,633 for the inertia production weld 118 since the initial weld speed would not have been adjusted by the variable weld speed algorithm. The upset 286 will typically follow the nominal upset 302 duplicating the upset 88 (FIG. 3) experienced during the inertia production cycle 56 (FIG. 3). The spindle deceleration will typically follow the nominal deceleration 304 or deceleration 84 (FIG. 3) of the sample inertia cycle 56.

During this deceleration 304, the logic controller 42 is repeatedly comparing the modified upset setpoint 144 to actual upset 302 and modulating drive torque 300 to attempt to match modified upset setpoint 144 and actual upset 302 as indicated by the sinusoidal oscillation of the drive torque 300. Once the spindle 18 is at zero velocity 306, the drive 24 commands zero torque 283 to the spindle 18. At zero velocity 306, a cooling dwell period 308 is initiated where weld pressure 290 (or upset pressure) is maintained for a predetermined period of time wherein the upset 302 may continue to increase. A final upset position 310 is determined at the end of the cooling dwell period 308 after the movement of the slide 30 toward the spindle 18 ceases. A final upset 312 of the inertia production weld can be calculated based on the difference between the upset zero position 288 and the final upset position 310. The final upset 312 relates to the displacement of the slide 30 caused be upset 302 during the inertia production cycle 120. Accordingly, inertia production cycle 120 controls upset 302 to achieve the specified amount of upset formation 115.

Still referring to FIG. 8, when the inertia production weld 118 is a torque modulated and upset targeted inertia weld in which the specified upset formation is less than the upset formation in the selected profile 114, the variable weld speed algorithm calculates a starting weld speed 322 and disengage speed 320 that are less than the corresponding speeds in the nominal case. This reduces the overall energy stored in the rotating parts of the weld system immediately prior to contacting the production parts 126, 128. The spindle 18 is accelerated to the adjusted disengage speed 320 and is then allowed to coast free from any influence from the drive 24 to the adjusted weld speed 322. Once the spindle 18 decelerates naturally to the adjusted weld speed 322, the weld system 10 commands the slide actuator 32 to move the slide 30 to bring the meeting faces of the two production parts 126, 128 into contact wherein the production parts 126, 128 have an initial length 138 when production part 128 contacts production part 126. Once contact of the meeting faces occurs, upset zero position 288 is established. In addition, when this contact occurs axial pressure can build to weld pressure 290. Also at this time, the drive 24, typically continues commanding zero torque 282 to the spindle 18. Alternatively, the drive 24 can apply a positive or negative torque at this time dependent on the braking torque of the profile 114.

The upset control phase 298 initiates when the turn-on upset parameter 294 or the turn-on speed parameter 324 is reached. In the reduced upset case, the variable weld speed algorithm reduces the turn-on speed 324 as compared to the nominal turn-on speed 296. During the upset control phase 298, the logic controller 42 starts modulating the torque 300, in response to the upset error signal 142 (FIG. 7), via the motion controller 36 in order to match the actual upset with the modified upset setpoint 144 as the weld process progresses. Even in the reduced upset case, torque contributions from the drive 24 will be relatively small and centered on the braking torque level of the inertia sample cycle 56 since the starting energy 270 of the system was lowered by the variable weld speed algorithm. The reduced upset 326 will typically initially follow the nominal upset 302 or the upset 88 experienced during the inertia sample cycle 56 (FIG. 3) until the weld approaches completion. The reduced upset spindle deceleration 328 will be generally parallel but lower than the nominal deceleration 304 or deceleration 84 of the sample inertia cycle 56 (FIG. 3), since spindle speed was lowered by the variable weld speed algorithm.

During this deceleration 328, the logic controller 42 is repeatedly comparing the modified upset setpoint 144 to actual upset 326 and modulating drive torque 300 to attempt to match modified upset setpoint 144 and actual upset 326 as indicated by the sinusoidal oscillation of the drive torque 300. Once the spindle 18 obtains zero velocity 330, the drive 24 commands zero torque 283 to the spindle 18. At zero velocity 330, a cooling dwell period 332 is initiated where weld pressure 290 (or upset pressure) is maintained for a predetermined period of time wherein the upset 326 may continue to increase. A final upset position 334 is determined at the end of the cooling dwell period 332 after the movement of the slide 30 toward the spindle 18 ceases. A final upset 336 of the production weld can be calculated based on the difference between the upset zero position 288 and the final upset position 334. The final upset 336 relates to the displacement of the slide 30 caused by upset 326 during the inertia production cycle 120. Accordingly, the inertia production cycle 120 controls upset 326 to achieve the specified amount of upset formation 115. Application of the variable weld speed algorithm modified the weld speed, based on the estimated starting energy, and thus minimized the reliance on the spindle drive to remove the energy difference necessary to produce the inertia weld with the targeted upset formation.

Still referring to FIG. 8, when the inertia production weld 118 is a torque modulated and upset targeted inertia weld in which the specified upset formation is greater than the upset formation in the selected profile 114, the variable weld speed algorithm calculates a starting weld speed 344 and disengage speed 352 that are greater than the corresponding speeds in the nominal case. This increases the overall energy stored in the rotating parts of the weld system immediately prior to contacting the production parts 126, 128. The spindle 18 is accelerated to the adjusted disengage speed 352 and is then allowed to coast free from any influence from the drive 24 to the adjusted weld speed 344. Once the spindle 18 decelerates naturally to the adjusted weld speed 344, the weld system 10 commands the slide actuator 32 to move the slide 30 to bring the meeting faces of the two production parts 126, 128 into contact wherein the production parts 126, 128 have an initial length 138 when production part 128 contacts production part 126. Once contact of the meeting faces occurs, upset zero position 288 is established. In addition, when this contact occurs axial pressure can build to weld pressure 290. Also at this time, the drive 24, typically continues commanding zero torque 282 to the spindle 18. Alternatively, the drive 24 can apply a positive or negative torque at this time dependent on the braking torque of the profile 114.

The upset control phase 298 initiates when the turn-on upset 294 or the turn-on speed 356 is reached. In the increased upset case, the variable weld speed algorithm increases the turn-on speed parameter 356 as compared to the nominal turn-on speed parameter 296. During the upset control phase 298, the logic controller 42 starts modulating the torque 300, in response to the upset error signal 142 (FIG. 7), via the motion controller 36 in order to match the actual upset with the modified upset setpoint 144 as the weld process progresses. Even in the increased upset case, torque contributions from the drive 24 will be relatively small and centered on the braking torque level of the inertia sample cycle 56 since the starting energy 270 of the system was increased by the variable weld speed algorithm. The increased upset formation 358 will typically follow the nominal upset formation 302 or the upset formation 88 experienced during the inertia sample cycle 56 (FIG. 3) until the weld approaches completion. The increased upset spindle deceleration 350 will be generally parallel but higher than the nominal deceleration 304 or deceleration 84 of the sample inertia cycle 56 (FIG. 3), since spindle speed was increased by the variable weld speed algorithm.

During this deceleration 350, the logic controller 42 is repeatedly comparing the modified upset setpoint 144 to actual upset 358 and modulating drive torque 300 to attempt to match modified upset setpoint 144 and actual upset 358 as indicated by the sinusoidal oscillation of the drive torque 300. Once the spindle 18 obtains zero velocity 352, the drive 24 commands zero torque 283 to the spindle 18. At zero velocity 352, a cooling dwell period 354 is initiated where weld pressure 290 (or upset pressure) is maintained for a predetermined period of time wherein the upset 358 may continue to increase. A final upset position 356 is determined at the end of the cooling dwell period 354 after the movement of the slide 30 toward the spindle 18 ceases. A final upset 359 of the production weld can be calculated based on the difference between the upset zero position 288 and the final upset position 356. The final upset 359 relates to the displacement of the slide 30 caused by upset 358 during the inertia production cycle 120. Accordingly, the inertia production cycle 120 controls upset 358 to achieve the specified amount of upset formation 115. Application of the variable weld speed algorithm modified the weld speed, based on the estimated starting energy, and thus minimized the reliance on the spindle drive to supply the energy difference necessary to produce the inertia weld with the targeted upset formation.

The methods described above in connection with the formation of the production inertia welds may be subsequently repeated to weld together on a volume basis any number of additional production parts.

Figure 9:
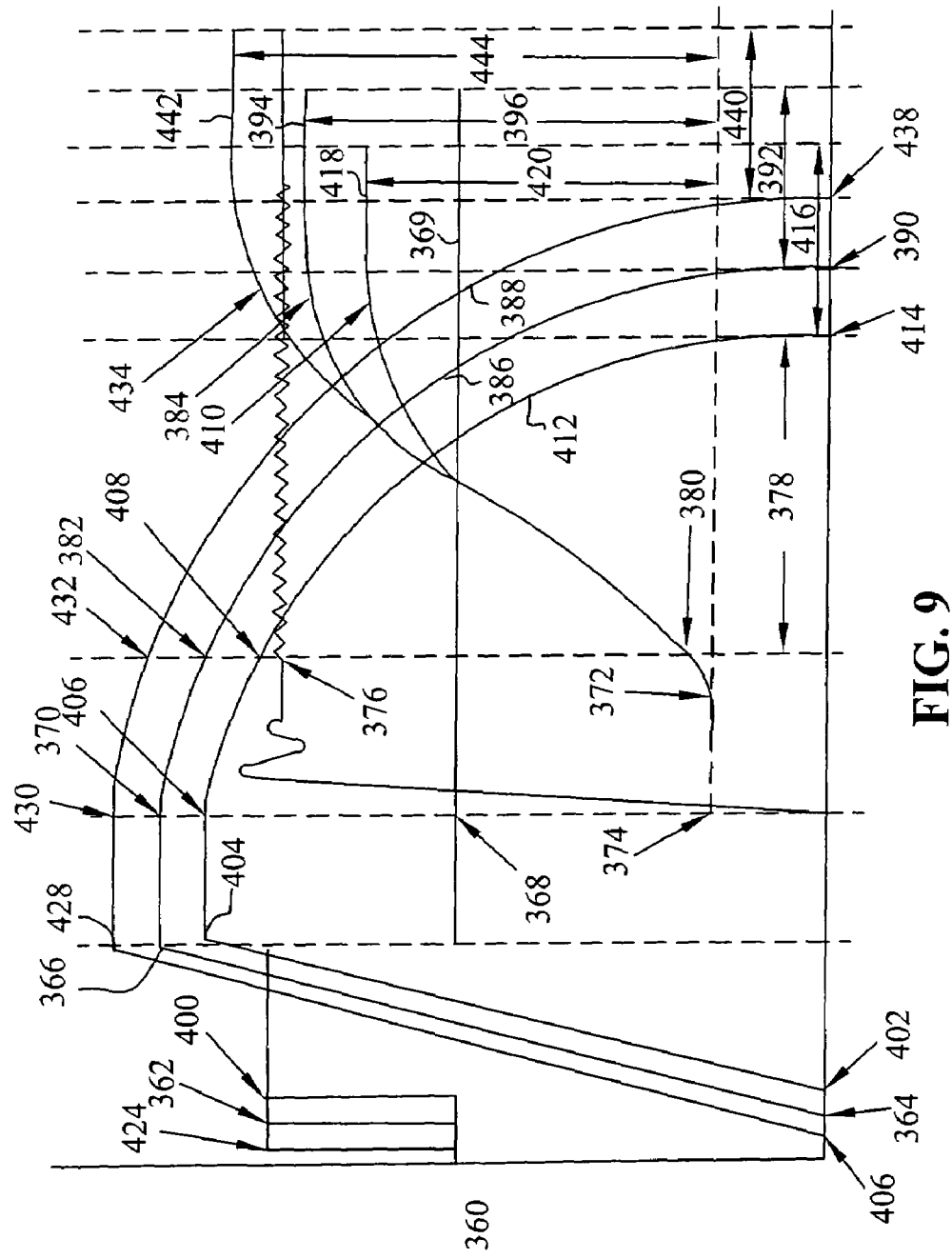
FIG. 9 is a graph based on data relating to the formation of three pressure modulated and upset targeted production inertia welds formed by inertia friction welding utilizing the variable weld speed algorithm in accordance with an embodiment of the present disclosure, illustrating spindle drive torque command, spindle angular velocity, upset, and pressure all on the vertical axis versus time represented on the horizontal axis. The graph illustrates the steps of a method for welding together production parts in combination with a predetermined profile calculated from the method graphically illustrated in FIG. 3 in accordance with an embodiment of the present disclosure.

Referring to FIG. 9, the weld system 10 (FIG. 1) begins inertia friction welding together a pair of production parts 126, 128 (FIG. 1) to form the inertia production weld 118 wherein the variable weld speed algorithm of the present disclosure modulates pressure during the inertia production cycle 120. After weld parameters such as the specified amount of upset formation 115 are input by the operator, the operator issues a start command 360 for the inertia production cycle 120.

FIG. 9 illustrates three examples of targeted upset formation, nominal upset [$\Delta$Upset=0], reduced upset [$\Delta$Upset<0], and increased upset [ΔUpset>0]. All three examples are illustrated with a profile braking torque of zero. FIG. 9 presents three inertia production welds with their associated time bases shifted in order to align the start of the welds in time on the graph. In other words, since the three inertia production welds 118 are accelerated to different disengage speeds, based on the calculated starting energy 270, the time scales have been shifted so that the end of the acceleration of each inertia production weld 118 occurs at the same point on the time axis.

In the nominal upset example, the drive 24 applies torque 362 to accelerate the spindle to the adjusted disengage speed 366. Once the spindle 18 has been accelerated to the disengage speed 366 and the drive 24 commands zero torque 368 to the spindle 18, the spindle 18 is rotating free from any influence from the drive 24, and is decelerating at a rate dependent on the inertia and frictional losses inherent in the system 10. Once the spindle 18 decelerates naturally to a preset weld speed 370, the weld system 10 commands the slide actuator 32 to move the slide 30 to bring the meeting faces of the two production parts 126, 128 into contact wherein the production parts 126, 128 have the combined length 138 when production part 128 contacts production part 126. This contact results in deceleration of the spindle 18 and the formation of the upset 372 as the slide 30 moves the meeting faces of the two production parts 126, 128 together. Once contact of the meeting faces occurs, upset zero position 374 is established. In addition, when this contact occurs axial pressure can build to weld pressure 376. Also at this time, the drive 24 typically continues commanding zero torque 368 to the spindle 18. Alternatively, the drive 24 can apply a positive or negative torque at this time dependent on the profile's braking (not shown).

The contact of the meeting faces puts a torque load on the spindle 18 due to the frictional weld torque between the two production parts 126, 128. This causes the spindle 18 to decelerate throughout the inertia production cycle 120. At a predetermined "upset speed", the weld system 10, can increase the axial load on the two production parts 126, 128, and, thus, increase to an "upset pressure" (not shown).

Since the inertia production weld 118 is a pressure modulated and upset targeted inertia weld in which the specified upset formation is equal to the upset formation in the selected profile, the upset control phase 378 is initiated when the turn-on upset 380 or the turn-on speed 382 is reached. In the nominal upset case, the logic controller 42 starts modulating the pressure 376 in response to the upset error 142 (FIG. 7) via the slide actuator 32 to match the actual upset with the modified upset setpoint 144 as the weld process progresses. With a zero change in targeted upset, as compared to the inertia sample cycle 56, initial weld speed is not adjusted by the variable weld speed algorithm. The upset 372 will typically follow the nominal upset 384 or upset 88 experienced during the inertia sample cycle 56 (FIG. 3). The spindle deceleration 386 will typically follow the deceleration 84 of the sample inertia cycle 56 (FIG. 3).

During this deceleration 386, the logic controller 42 is repeatedly comparing the modified upset setpoint 144 to actual upset 384 and modulating weld pressure 376 to attempt to match the modified upset setpoint 144 and the actual upset 384 as indicated by the sinusoidal oscillation of the pressure 376. Once the spindle 18 reaches zero velocity 390, the drive 24 commands zero torque 369 to the spindle 18. At zero velocity 390, a cooling dwell period 392 initiates where weld pressure 376 (or upset pressure) is maintained for a predetermined period of time wherein the upset 384 may continue to increase. A final upset position 394 is determined at the end of the cooling dwell period 392 after the movement of the slide 30 toward the spindle 18 ceases. A final upset 396 of the product weld can be calculated based on the difference between the upset zero position 374 and the final upset position 394. The final upset 396 relates to the displacement of the slide 30 caused by upset 384 during the inertia production cycle 120. Accordingly, the inertia production cycle 120 controls upset 384 to achieve the specified amount of upset formation 115.

Still referring to FIG. 9, when the inertia production weld 118 is a pressure modulated and upset targeted inertia weld in which the specified upset formation is less than the upset formation in the selected profile 114, the variable weld speed algorithm calculates a starting weld speed 406 and disengage speed 404 that are less than the corresponding speeds in the nominal case. This reduces the overall energy stored in the rotating parts of the weld system immediately prior to contacting the production parts 126, 128. The spindle 18 is accelerated to the adjusted disengage speed 404 and is then allowed to coast free from any influence from the drive 24 to the adjusted weld speed 406. Once the spindle 18 decelerates naturally to the adjusted weld speed 406, the weld system 10 commands the slide actuator 32 to move the slide 30 to bring the meeting faces of the two production parts 126, 128 into contact wherein the production parts 126, 128 have an initial length 138 when production part 128 contacts production part 126. Once contact of the meeting faces occurs, upset zero position 374 is established. In addition, when this contact occurs axial pressure can build to weld pressure 376. Also at this time, the drive 24, typically continues commanding zero torque 282 to the spindle 18. Alternatively, the drive 24 can apply a positive or negative torque at this time dependent on the braking torque of the profile 114.

The upset control phase 378 initiates when the turn-on upset 380 or the turn-on speed 408 is reached. In the reduced upset case, the variable weld speed algorithm reduces the turn-on speed parameter 408 as compared to the nominal turn-on speed parameter 382. During the upset control phase 378, the logic controller 42 starts modulating the pressure 376, in response to the upset error signal 142 (FIG. 7), via the slide actuator 32 in order to match the actual upset with the modified upset setpoint 144 as the weld process progresses. Even in the reduced upset case, pressure adjustments will be relatively small and centered around weld pressure of the inertia sample weld cycle 56 since the starting energy 270 of the system was lowered by the variable weld speed algorithm. The reduced upset 410 will typically follow the nominal upset 384 or the upset 88 experienced during the inertia sample cycle 56 (FIG. 3) until the weld approaches completion. The reduced upset spindle deceleration 412 will be generally parallel but lower than the nominal deceleration 386 or deceleration 84 of the sample inertia cycle 56 (FIG. 3), since spindle speed was lowered by the variable weld speed algorithm.

During this deceleration 412, the logic controller 42 is repeatedly comparing the modified upset setpoint 144 to actual upset 410 and modulating pressure 376 to attempt to match modified upset setpoint 142 and actual upset 410 as indicated by the sinusoidal oscillation of the weld pressure 376. Once the spindle 18 obtains zero velocity 414, the drive 24 commands zero torque 369 to the spindle 18. At zero velocity 414, a cooling dwell period 416 is initiated where weld pressure 376 (or upset pressure) is maintained for a predetermined period of time wherein the upset 410 may continue to increase. A final upset position 418 is determined at the end of the cooling dwell period 416 after the movement of the slide 30 toward the spindle 18 ceases. A final upset 420 of the production weld can be calculated based on the difference between the upset zero position 374 and the final upset position 418. The final upset 420 relates to the displacement of the slide 30 caused by upset 410 during the inertia production cycle 120. Accordingly, the inertia production cycle 120 controls upset 410 to achieve the specified amount of upset formation 115. Application of the variable weld speed algorithm modified the weld speed, based on the estimated starting energy, and thus minimized the reliance on the pressure variations to control the upset formation as necessary to produce the inertia weld with the targeted upset formation.

Still referring to FIG. 9, when the inertia production weld 118 is a pressure modulated and upset targeted inertia weld in which the specified upset formation is greater than the upset formation in the selected profile 114, the variable weld speed algorithm calculates a starting weld speed 430 and disengage speed 428 that are greater than the corresponding speeds in the nominal case. This increases the overall energy stored in the rotating parts of the weld system immediately prior to contacting the production parts 126, 128. The spindle 18 is accelerated to the adjusted disengage speed 428 and is then allowed to coast free from any influence from the drive 24 to the adjusted weld speed 430. Once the spindle 18 decelerates naturally to the adjusted weld speed 430, the weld system 10 commands the slide actuator 32 to move the slide 30 to bring the meeting faces of the two production parts 126, 128 into contact wherein the production parts 126, 128 have an initial length 138 when production part 128 contacts production part 126. Once contact of the meeting faces occurs, upset zero position 374 is established. In addition, when this contact occurs axial pressure can build to weld pressure 376. Also at this time, the drive 24, typically continues commanding zero torque 368 to the spindle 18. Alternatively, the drive 24 can apply a positive or negative torque at this time dependent on the braking torque of the profile 114.

The upset control phase 378 initiates when the turn-on upset 380 or the turn-on speed 432 is reached. In the increased upset case, the variable weld speed algorithm increases the turn-on speed parameter 432 as compared to the nominal turn-on speed parameter 382. During the upset control phase 378, the logic controller 42 starts modulating the pressure 376 in response to the upset error signal 142 (FIG. 7), via the slide actuator 32 in order to match the actual upset with the modified upset setpoint 144 as the weld process progresses. Even in the increased upset case, pressure adjustments will be relatively small and centered around weld pressure of the inertia sample weld cycle 56 since the starting energy 270 of the system was increased by the variable weld speed algorithm. The increased upset formation 434 will typically follow the nominal upset formation 384 or the upset formation 88 experienced during the inertia sample cycle 56 (FIG. 3) until the weld approaches completion. The increased upset spindle deceleration 388 will be generally parallel but higher than the nominal deceleration 386 or deceleration 84 of the sample inertia cycle 56 (FIG. 3), since spindle speed was increased by the variable weld speed algorithm.

During this deceleration 388, the logic controller 42 is repeatedly comparing the modified upset setpoint 144 to actual upset 434 and modulating weld pressure 376 to attempt to match modified upset setpoint 144 and actual upset 434 as indicated by the sinusoidal oscillation of the pressure 376. Once the spindle 18 obtains zero velocity 438, the drive 24 commands zero torque 369 to the spindle 18. At zero velocity 438, a cooling dwell period 440 is initiated where weld pressure 376 (or upset pressure) is maintained for a predetermined period of time wherein the upset 434 may continue to increase. A final upset position 442 is determined at the end of the cooling dwell period 440 after the movement of the slide 30 toward the spindle 18 ceases. A final upset 444 of the production weld can be calculated based on the difference between the upset zero position 374 and the final upset position 442. The final upset 444 relates to the displacement of the slide 30 caused by upset 434 during the inertia production cycle 120. Accordingly, the inertia production cycle 120 controls upset 434 to achieve the specified amount of upset formation 115. Application of the variable weld speed algorithm modified the weld speed, based on the estimated starting energy, and thus minimized the reliance on the pressure variations to control the upset formation as necessary to produce the inertia weld with the targeted upset formation.

The methods described above in connection with the formation of the production inertia welds may be subsequently repeated to weld together on a volume basis any number of additional production parts.

In pressure modulated upset control implementation, limits may be placed on the minimum load and maximum load allowed. These load limits should be derived from matrix studies to determine that weld quality has not been compromised. In addition, in the variable weld speed algorithm implementation, limits may be placed on the minimum weld speed and maximum weld speed allowed. These weld speed limits should also be derived from matrix studies to determine that weld quality has not been compromised.

These techniques described in the present disclosure are useful in the formation of product by allowing the operator to specify the final upset formation. Alternatively, the technique of upset targeting can be used to control final product length in an inertia weld. To apply either the pressure modulated upset control or the torque modulated upset control to control the welded final product length in an inertia weld, the present disclosure may define the welded final length as the sum of the initial lengths for the production parts minus the upset.

The combined length of the production parts can be premeasured in another machine and the dimensional information may be transferred to the friction welder control through any of many standard communication links known in the art. Alternatively, the information may be entered by the operator manually into the CPU interface. The combined length of the production parts 1 and 2 can also be measured dynamically during the cycle. Thus, the ability to produce an inertia weld with a targeted amount of upset formation also enables the ability to produce an inertia weld with a targeted final welded part length. All of the algorithms and examples presented in this disclosure apply equally to the targeting of final welded part length.

While the concepts of the present disclosure have been illustrated and described in detail in the drawings and foregoing description, such an illustration and description is to be considered as exemplary and not restrictive in character, it being understood that only the illustrative embodiment has been shown and described and that all changes and modifications that come within the spirit of the disclosure are desired to be protected by the claims set forth below.

The invention claimed is:

1. A method of inertia friction welding, comprising:
   providing a pair of sample parts by connecting one of the pair of sample parts with a spindle and connecting the other sample part with a slide;

inertia friction welding together the pair of sample parts resulting in rotational deceleration of the spindle, movement of the slide toward the spindle and contact between the one sample part and the other sample part causing upset formation and resulting in formation of a sample weld;

acquiring data related to the rotational deceleration of the spindle and the movement of the slide during the formation of the sample weld;

calculating a profile from the acquired data;

providing a pair of production parts by connecting one of the pair of production parts with the spindle and connecting the other production part with the slide;

specifying an amount of final upset formation to be experienced by the pair of production parts;

inertia friction welding together the pair of production parts resulting in rotational deceleration of the spindle, movement of the slide toward the spindle and contact between the one production part and the other production part causing upset formation and resulting in formation of a production weld;

modifying the profile based on the difference between the final upset of the sample weld and the specified amount of final upset formation;

calculating the difference between the upset formation resulting from the inertia friction welding of the pair of production parts and an upset setpoint calculated from the modified profile; and modulating an input applied to the pair of production parts during the inertia friction welding of the pair of production parts based on the calculated upset difference thereby controlling upset formation of the pair of production parts to achieve the specified amount of final upset formation.

2. The method of claim 1 wherein modulating the input comprises modulating torque applied to the spindle during the inertia friction welding of the pair of production parts.

3. The method of claim 2 wherein modulating the torque controls the rotational deceleration of the spindle to control the upset formation during the inertia friction welding of the pair of production parts to achieve the specified amount of final upset formation.

4. The method of claim 1 wherein modulating the input comprises modulating pressure applied to the slide during the inertia friction welding of the pair of production parts.

5. The method of claim 4 wherein modulating the pressure affects the rate of upset formation during the inertia friction welding of the pair of production parts to achieve the specified amount of final upset formation.

6. The method of claim 1 wherein acquiring the data for the profile comprises measuring the rotational speed of the spindle at various instances of time during formation of the sample weld.

7. The method of claim 6 wherein acquiring the data for the profile comprises measuring the slide position at various instances of time during formation of the sample weld, the slide position and movement of the slide being related to the upset formation experienced by the pair of sample parts.

8. The method of claim 1 wherein calculating the profile includes modeling the relationship of the upset formation of the sample weld as a function of the rotational speed of the spindle during formation of the sample weld.

9. The method of claim 8 wherein modeling the relationship of the upset formation of the sample weld with the rotational speed of the spindle during formation of the sample weld comprises generating an upset setpoint for various spindle speeds.

10. The method of claim 9, wherein the profile is indexed by the speed of the spindle.

11. The method of claim 10 wherein modifying the profile comprises generating a modified upset setpoint for each speed index of the spindle during the inertia friction welding of the pair of production parts based on the upset setpoint of the profile for current speed of the spindle during formation of the production weld, the final upset of the sample weld and the specified amount of final upset formation.

12. The method of claim 11 wherein calculating the difference between the upset formation resulting from the inertia friction welding of the pair of production parts with the upset setpoint calculated from the modified profile comprises comparing at various instances of time during the inertia friction welding of the pair of production parts upset formation of the pair of production parts with an upset setpoint of the modified profile corresponding to the rotational speed of the spindle at that instant in time.

13. The method of claim 12 wherein modulating the input further comprises calculating the difference between the upset setpoint of the modified profile and the actual upset formation of the inertia production weld to generate an error signal.

14. The method of claim 13 wherein modulating the input comprises changing the magnitude of the input based on the error signal.

15. The method of claim 1 wherein specifying an amount of final upset formation to be experienced by the pair of production parts comprises premeasuring dimensions of the production parts and calculating the amount of upset needed to achieve a specified target final welded part length.

16. A method of inertia friction welding, comprising:

providing a pair of sample parts by connecting one of the pair of sample parts with a spindle and connecting the other sample part with a slide;

inertia friction welding together the pair of sample parts resulting in rotational deceleration of the spindle, movement of the slide toward the spindle and contact between the one sample part and the other sample part causing upset formation and resulting in formation of a sample weld;

acquiring data related to the rotational deceleration of the spindle and the movement of the slide during the formation of the sample weld;

calculating a profile from the acquired data;

providing a pair of production parts by connecting one of the pair of production parts with the spindle and connecting the other production part with the slide;

specifying an amount of final upset formation to be experienced by the pair of production parts;

estimating a start energy necessary to achieve the specified amount of final upset formation;

adjusting a disengage speed and weld speed based on the start energy to initiate inertia friction welding together the pair of production parts resulting in rotational deceleration of the spindle, movement of the slide toward the spindle and contact between the one production part and the other production part causing upset formation and resulting in formation of a production weld;

modifying the profile based on the difference between the final upset of the sample weld and the specified amount of upset formation;

calculating the difference between the upset formation resulting from the inertia friction welding of the pair of production parts and the upset formation calculated from the modified profile; and modulating an input applied to the pair of production parts during the inertia friction welding of the pair of production parts based on the calculated upset difference thereby controlling upset formation of the pair of production parts to achieve the specified amount of final upset formation.

17. The method of claim 16 wherein estimating a start energy necessary to achieve the specified amount of final upset formation comprises executing multiple non-upset controlled welds with various starting energies and establishing an empirical relationship between starting energy and resulting final upset.

18. The method of claim 17 wherein the step of applying the start energy results in one of an increase in the start energy and a decrease in the start energy.

19. The method of claim 18 wherein after the start energy is adjusted, an upset error signal is calculated to command one of torque and pressure modulation during the deceleration of the inertia friction welding of the production parts.

20. The method of claim 16 wherein modulating the input comprises modulating torque applied to the spindle during the inertia friction welding of the pair of production parts.

21. The method of claim 20 wherein modulating the torque controls the rotational deceleration of the spindle to control the upset formation during the inertia friction welding of the pair of production parts to achieve the specified amount of final upset formation.

22. The method of claim 16 wherein modulating the input comprises modulating pressure applied to the slide during the inertia friction welding of the pair of production parts.

23. The method of claim 22 wherein modulating the pressure affects the rate of upset formation during the inertia friction welding of the pair of production parts to achieve the specified amount of final upset formation.

24. The method of claim 16 wherein acquiring the data for the profile comprises measuring the rotational speed of the spindle at various instances of time during formation of the sample weld.

25. The method of claim 24 wherein acquiring the data for the profile comprises measuring the slide position at various instances of time during formation of the sample weld, the slide position and movement of the slide being related to the upset formation experienced by the pair of sample parts.

26. The method of claim 16 wherein calculating the profile includes modeling the relationship of the upset formation of the sample weld as a function of the rotational speed of the spindle during formation of the sample weld.

27. The method of claim 26 wherein modeling the relationship of the upset formation of the sample weld with the rotational speed of the spindle during formation of the sample weld comprises generating an upset setpoint for various spindle speeds.

28. The method of claim 27, wherein the profile is indexed by the speed of the spindle.

29. The method of claim 28 wherein modifying the profile comprises generating a modified upset setpoint for each speed index of the spindle during the inertia friction welding of the pair of production parts based on the upset setpoint of the profile for current speed of the spindle during formation of the production weld, the final upset of the sample weld and the specified amount of final upset formation.

30. The method of claim 29 wherein generating a modified upset setpoint for each speed index comprises calculating the sample weld profile index from the current production weld spindle speed by equating the energy consumed, on a percent energy available for upset formation basis, for the sample and production welds.

31. The method of claim 30 wherein generating a modified upset setpoint for each speed index further comprises calculating a modified upset setpoint in proportion to the upset generated in the sample weld at an equivalent level of consumed energy available for upset.

32. The method of claim 29 wherein calculating the difference between the upset formation resulting from the inertia friction welding of the pair of production parts with the upset setpoint calculated from the modified profile comprises comparing at various instances of time during the inertia friction welding of the pair of production parts upset formation of the pair of production parts with an upset setpoint of the modified profile corresponding to the rotational speed of the spindle at that instant in time.

33. The method of claim 32 wherein modulating the input further comprises calculating the difference between the upset setpoint of the modified profile and the actual upset formation of the inertia production weld to generate an error signal.

34. The method of claim 33 wherein modulating the input comprises changing the magnitude of the input based on the error signal.

35. The method of claim 16 wherein specifying an amount of final upset formation to be experienced by the pair of production parts comprises premeasuring dimensions of the production parts and calculating the amount of upset needed to achieve a specified target final welded part length.

* * * * *